United States Patent
Ishii

(10) Patent No.: US 6,269,182 B1
(45) Date of Patent: *Jul. 31, 2001

(54) COLOR MEASURING SYSTEM USING MULTISPECTRAL IMAGE DATA

(75) Inventor: Kensuke Ishii, Tokyo (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/649,037

(22) Filed: May 16, 1996

(30) Foreign Application Priority Data

May 23, 1995 (JP) .................................... 7-123789
May 13, 1996 (JP) .................................... 8-117566

(51) Int. Cl.[7] ...................................... G06K 9/00
(52) U.S. Cl. ......................... 382/165; 382/227; 356/418
(58) Field of Search ...................... 382/165, 162, 382/224, 225, 226, 228, 227; 364/526; 356/402, 406, 418, 419

(56) References Cited

U.S. PATENT DOCUMENTS

| | | | |
|---|---|---|---|
| 4,830,501 | * 5/1989 | Terashita | 356/402 |
| 5,060,278 | * 10/1991 | Fukumizu | 382/227 |
| 5,221,959 | * 6/1993 | Ohyama et al. | 356/419 |
| 5,557,414 | * 9/1996 | Allaire et al. | 356/402 |
| 5,586,663 | * 12/1996 | Graudejus et al. | 356/406 |
| 5,717,605 | * 2/1998 | Komiya et al. | 364/526 |

OTHER PUBLICATIONS

Webster's Ninth New Collegiate Dictionary, p. 270, 1991.*
Article entitled "Image Classification by the Foley–Sammon Transform", published Optical Engineering, Jul., 1986, vol. 25, No. 7, pp. 834–840.
Article entitled "A Declustering Criterion for Feature Extraction in Pattern Recognition", published IEEE Transactions on Computers, vol. C–27, No. 3, Mar., 1978 pp. 261–166.
Article entitled "Linear Classifiers", published Introduction to Statistical Pattern Recognition, Academic Press, Inc., 1972, Chapter 4, pp. 89–119.

* cited by examiner

Primary Examiner—Jon Chang
(74) Attorney, Agent, or Firm—Frishauf, Holtz, Goodman, Langer & Chick, P.C.

(57) ABSTRACT

A color measuring system includes a color classifying apparatus and a color nonuniformity checking apparatus capable of measuring color nonuniformity which simplify the configuration, reduce cost, withstand mechanical vibration, and are capable of classifying the colors of objects well without limiting the light source even when its spectrum varies, and which are capaple of further improving the color classification accuracy. The color classifying apparatus includes an imaging section for imaging the reflected light from an object, a plurality of band-pass dilters each having a different band and provided between the object and the imaging section, and a classifying section for computing a classification spectrum for classification using a statistical approach from the multispectral image data on the object imaged by the imaging section and classifying the object using the classification spectrum, wherein the classifying section uses a classification judgment method most suitable for classification judgement on the object.

13 Claims, 31 Drawing Sheets

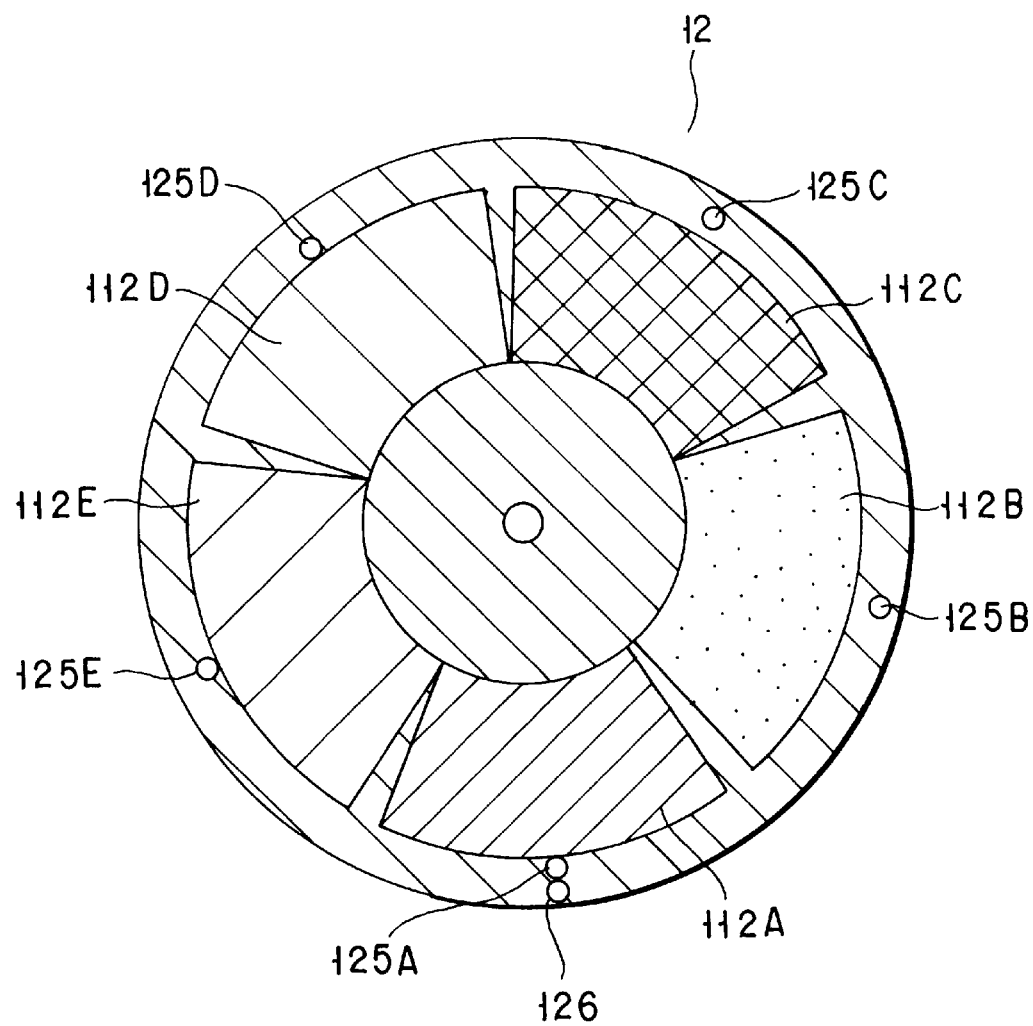
F I G. 2

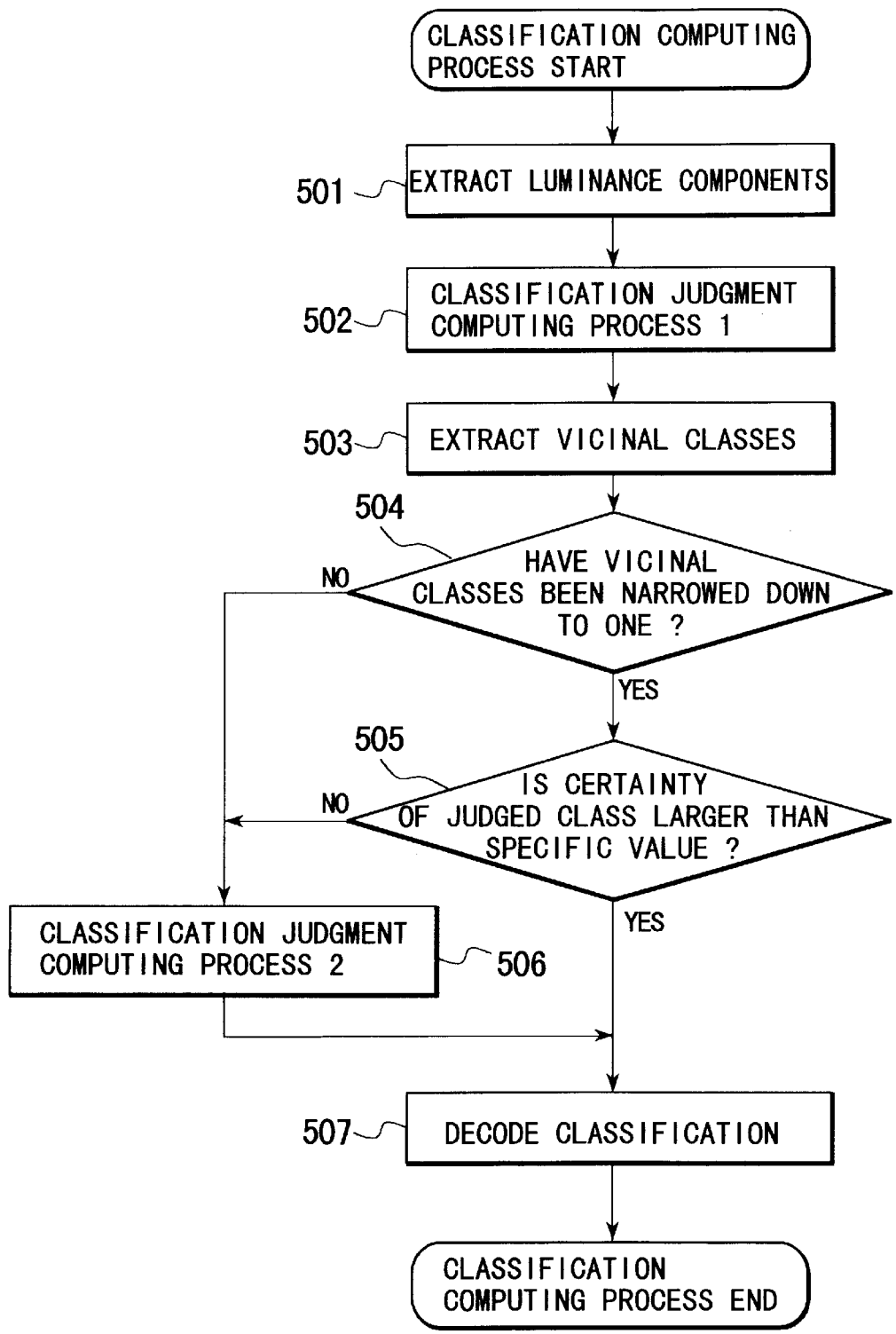
F I G. 13

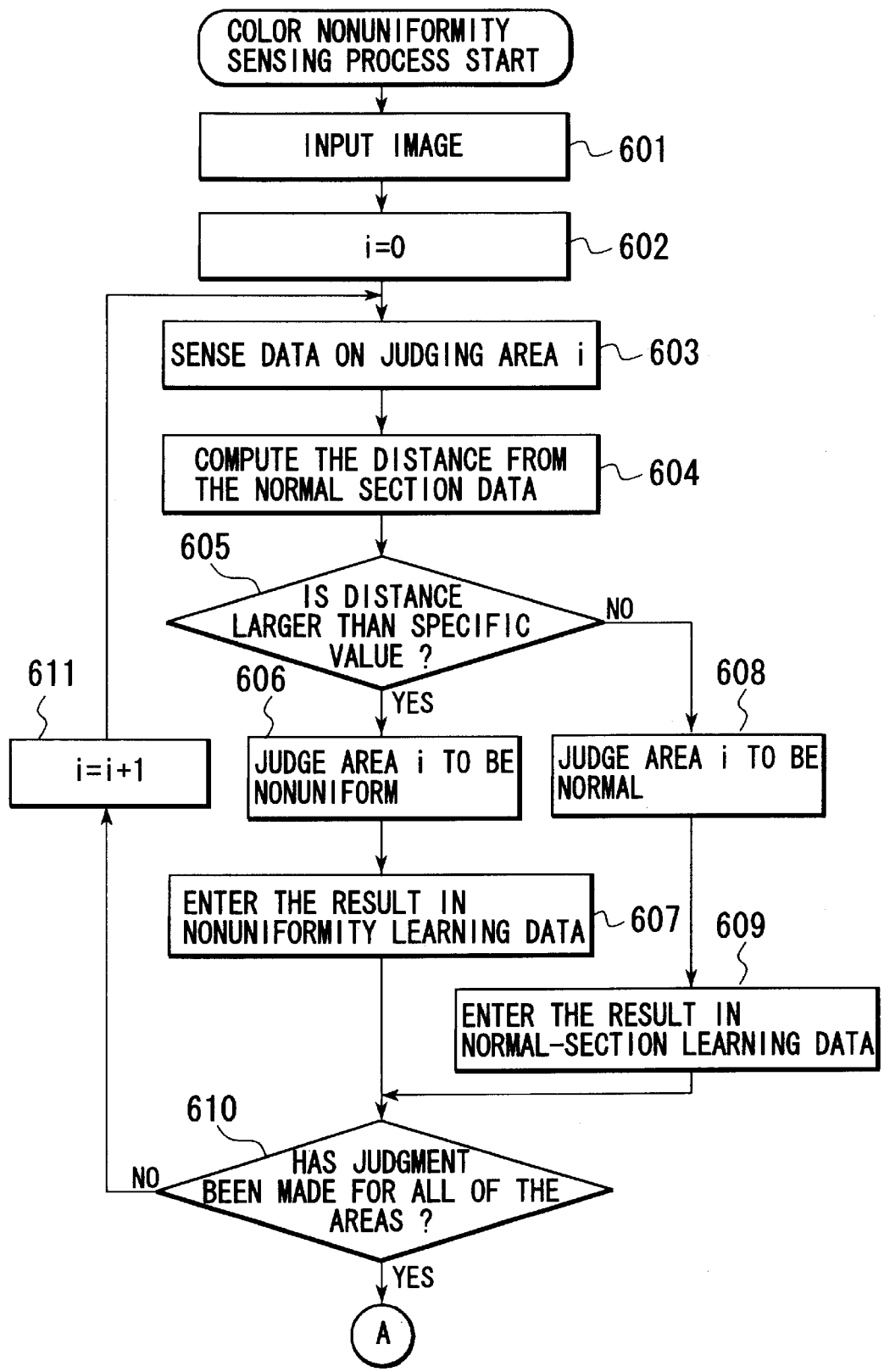
F I G. 15A

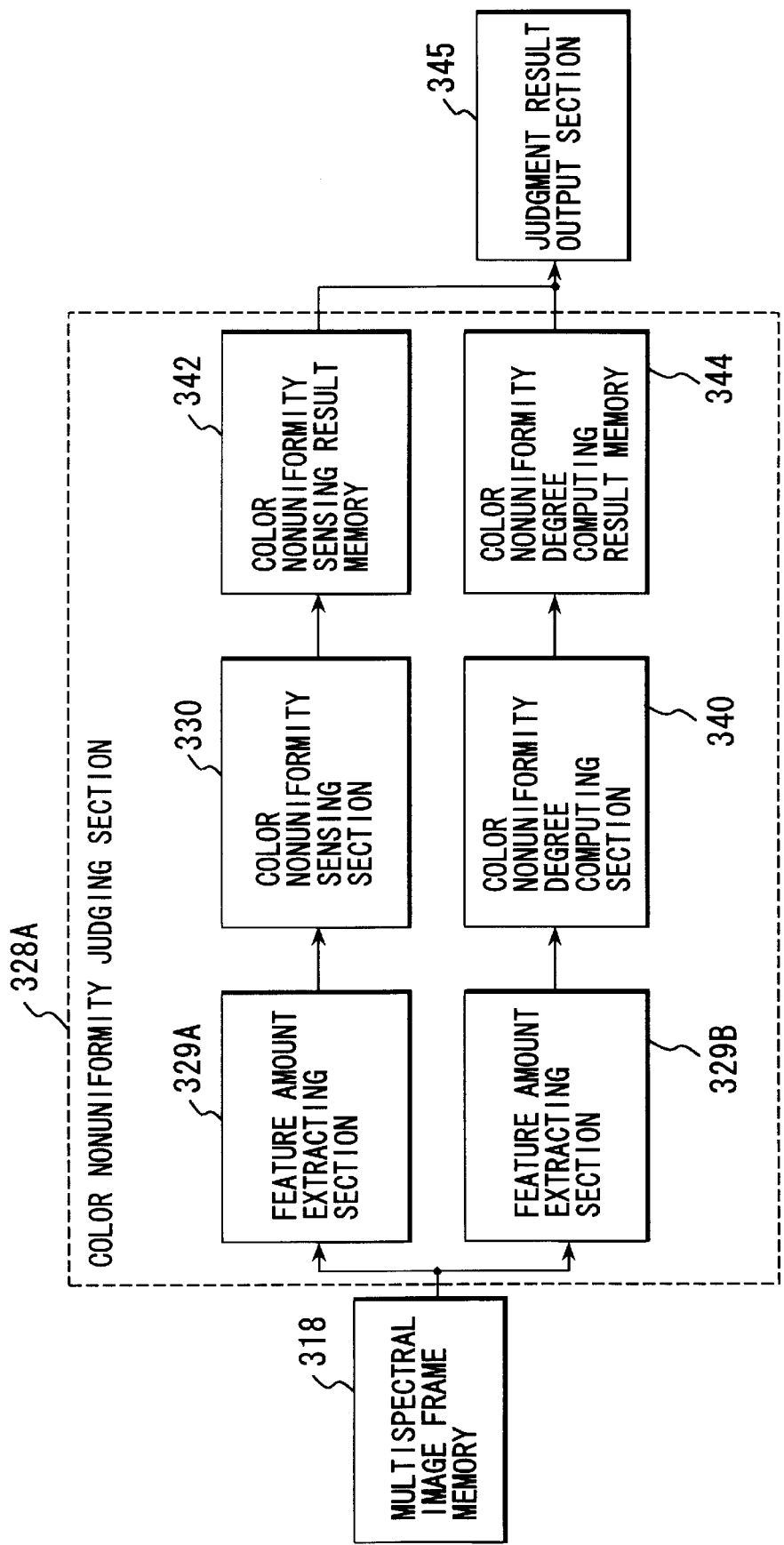
F I G. 21

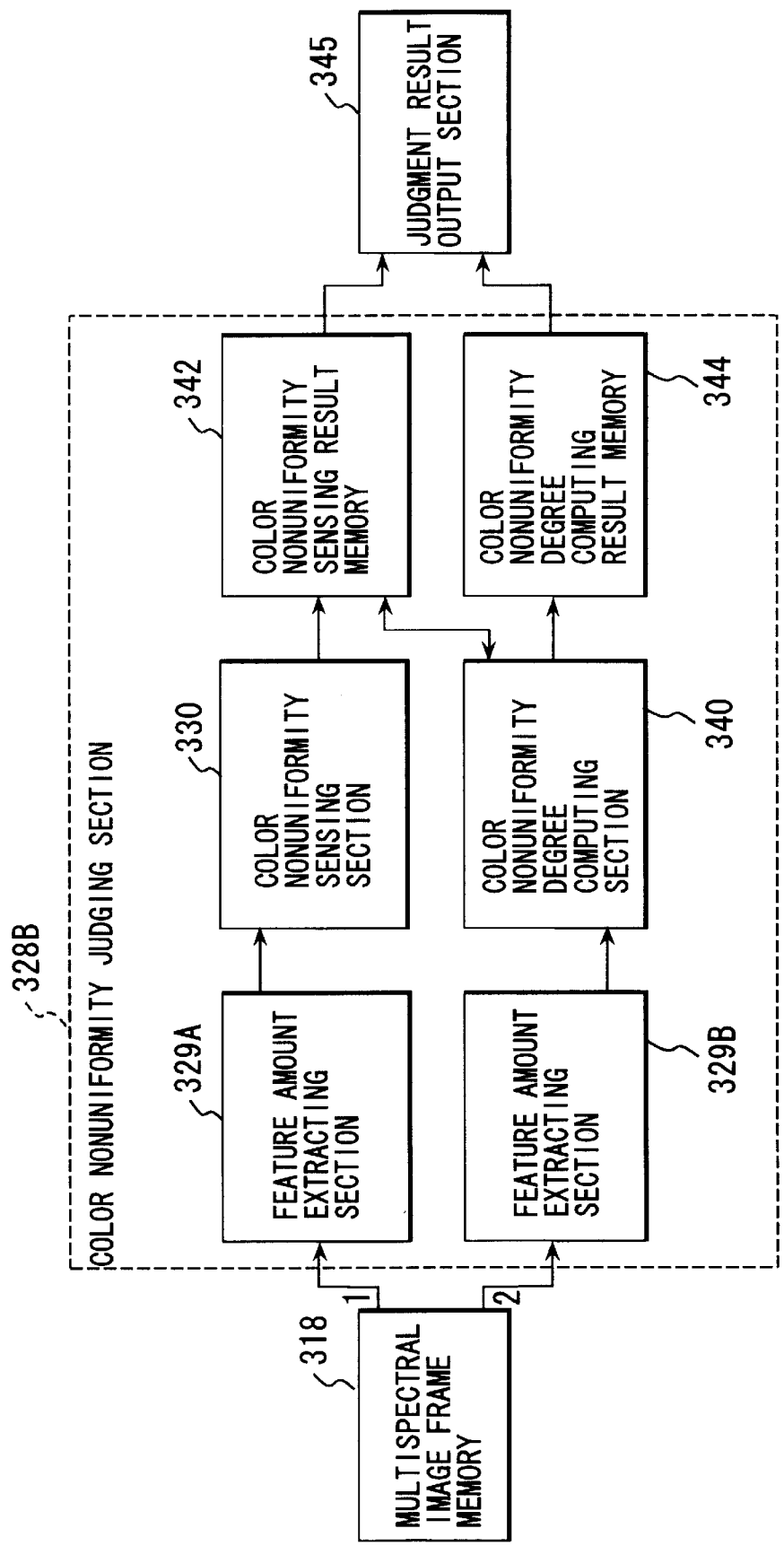
F I G. 22

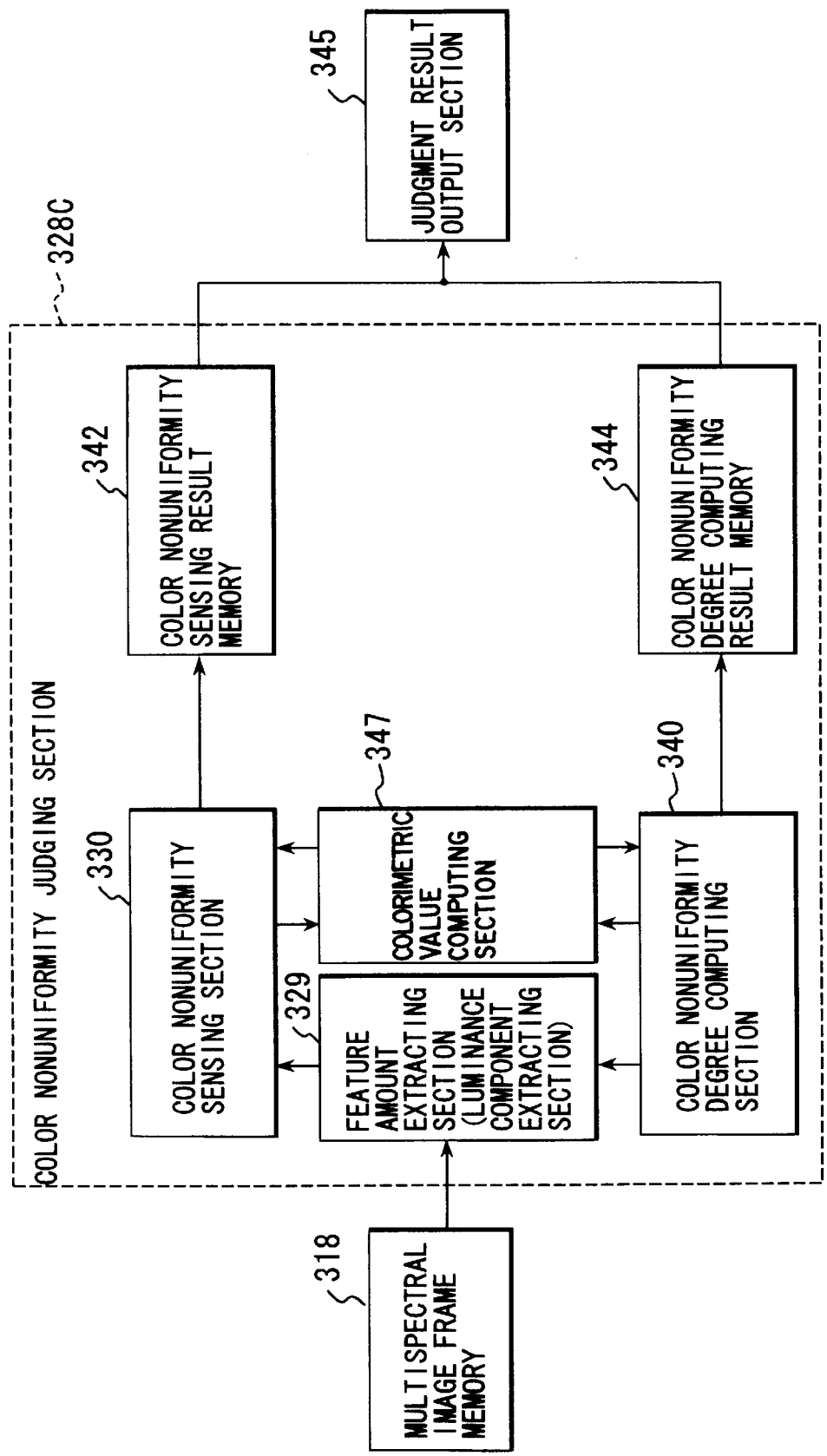
F I G. 23

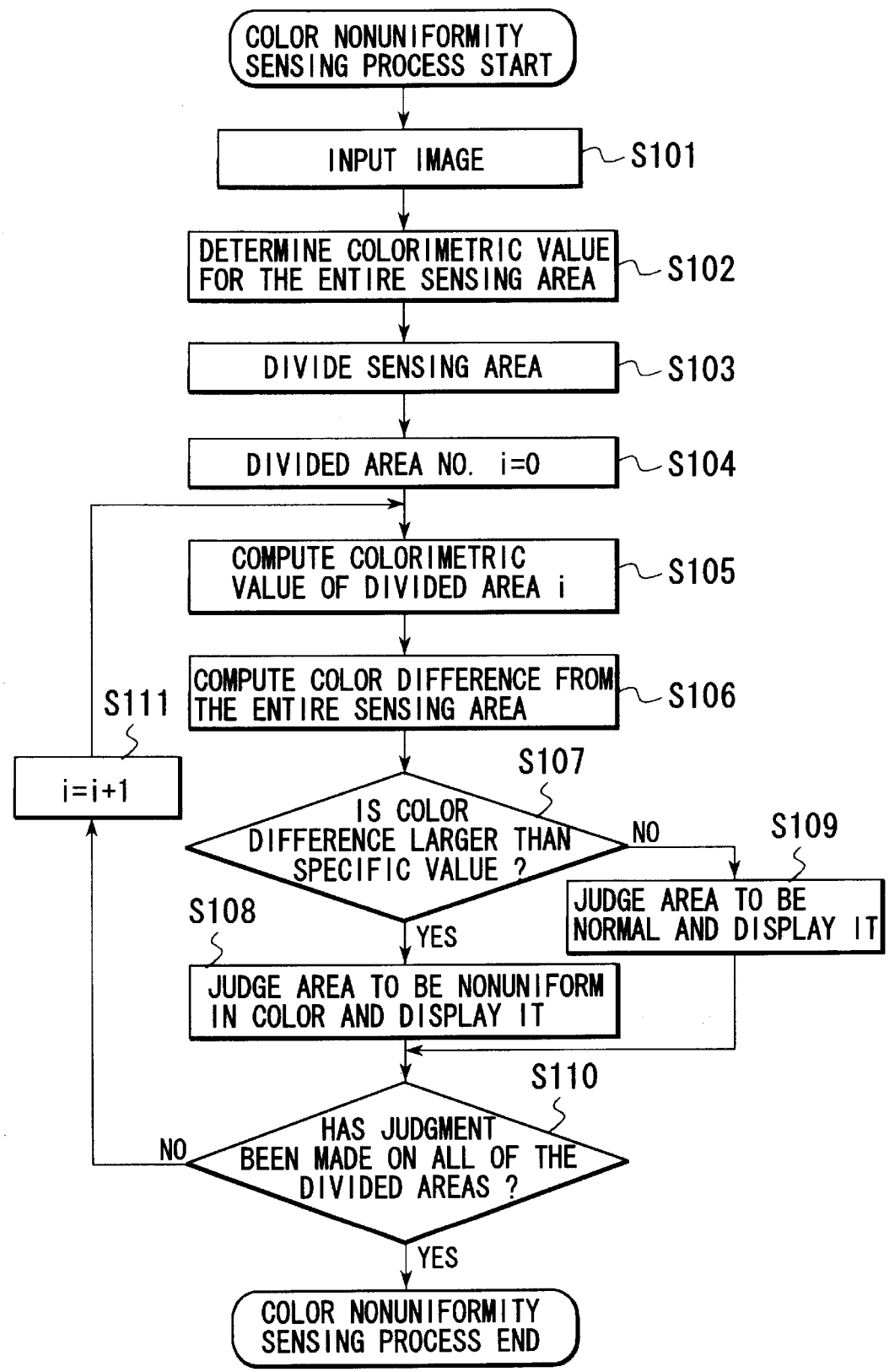
F I G. 24

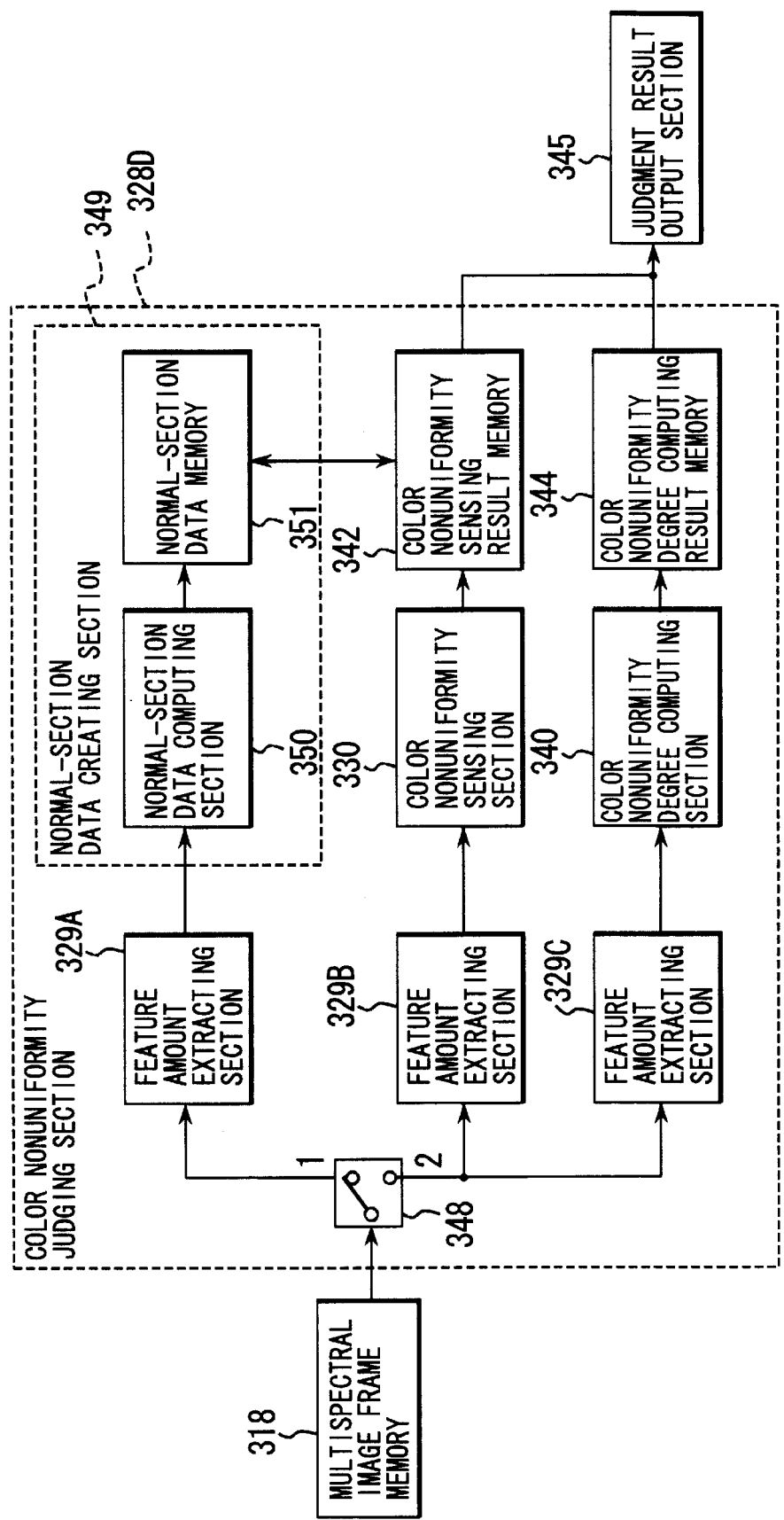
F I G. 27

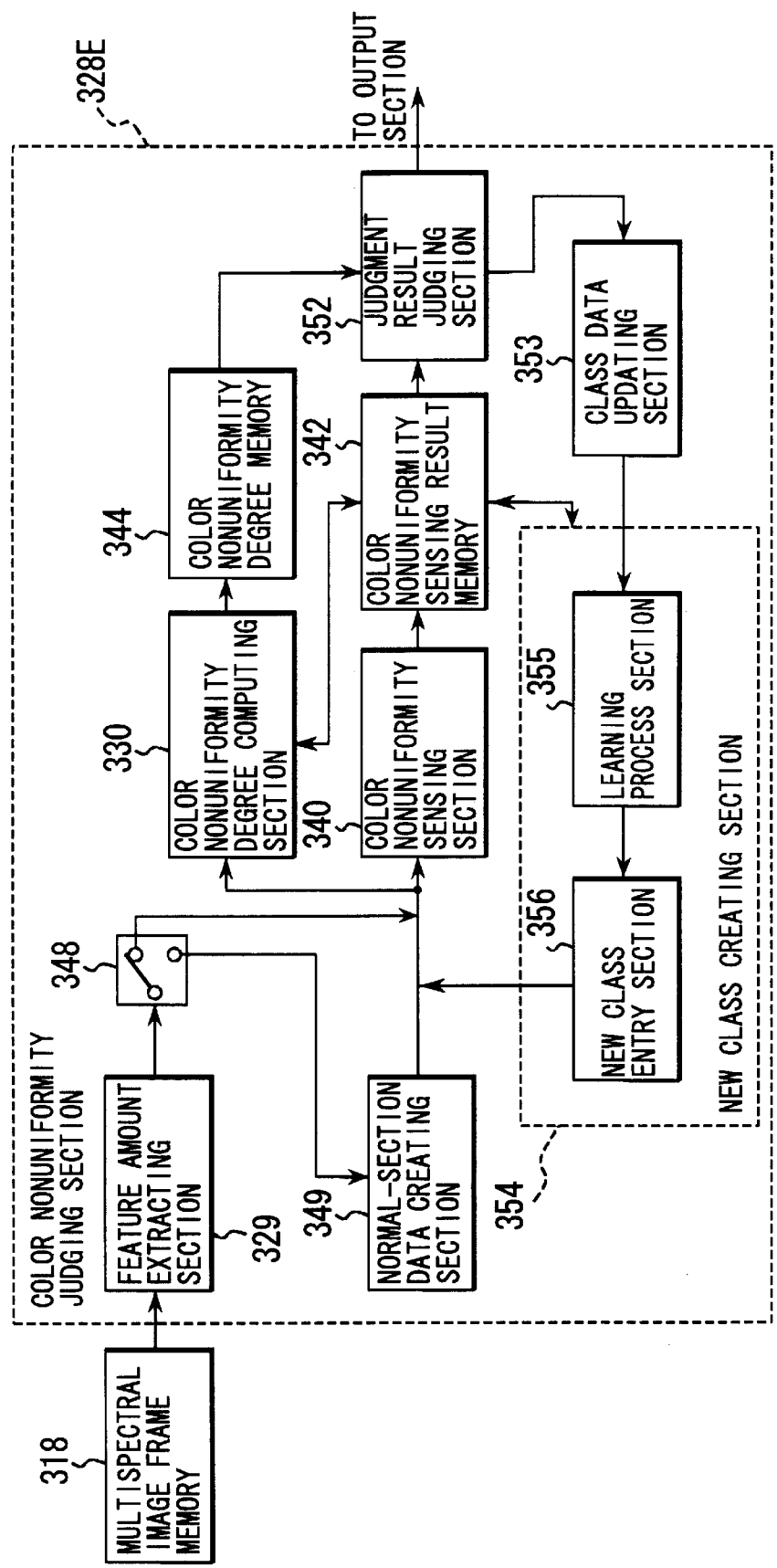
F I G. 28

COLOR MEASURING SYSTEM USING MULTISPECTRAL IMAGE DATA

BACKGROUND OF THE INVENTION

1. Field of the Invention

This invention relates to a color measuring system that measures the colors of objects using multispectral image data obtained via a plurality of band-pass filters, and more particularly to a color classifying apparatus that sorts objects by color and a color nonuniformity checking apparatus that checks objects for color nonuniformity.

2. Description of the Related Art

Color identifying systems that identify the color of objects and color measuring systems that measure the colors of objects have been used in managing both painting and dyeing at job sites in various industries as well as for measuring the colors of specimens in the medical and scientific fields.

Color identifying systems and color measuring systems of this type have been disclosed in, for example, Jpn. Pat. Appln. KOKAI Publication No. 3-267726, where the reflected spectral spectrum of an object is sorted into two classes by performing a statistical process on the spectrum.

Specifically, the reflected spectral spectrum of an object whose class is known is subjected to a statistical process using the Foley Sammon transform (FS transform) method (refer to Q. Tian, M. Barbaro, et al., "Image classification by the Foley-Sammon transform," Optical Engineering, Vol. 25, No. 7, 1986).

The FS transform method is an approach whereby a spectrum is sorted into two classes. Specifically, this approach is to find spectrum di for a classification that maximizes Fisher ratio R(di) determined by the following equation (1):

$$R(di)=(di^t S1 di)/(di^t S2 di) \qquad (1)$$

where di is a classification spectrum,
$di^t$ is a classification spectrum (transposition),
S1 is an interclass covariance matrix and
S2 is an intraclass covariance matrix.

Hereinafter, spectrum di for this classification is referred to as a classification spectrum.

Since the classification spectrum di has the same number of dimensions as the spectrum of the object, to be precise, it should be expressed as di($\lambda$), but for the sake of simplicity, it is represented as di.

Two types of classification spectrums that make the Fisher ratio larger will be found.

A classification spectrum di that maximizes the Fisher ratio is determined to be d1 and the one that maximizes the Fisher ratio in the spectrums perpendicular to d1 is determined to be d2.

By projecting each data item on the space constructed by the two classification spectrums d1 and d2, a spectrum is sorted into two classes.

The classification spectrums d1 and d2 are obtained from the following equation (2):

$$d1 = \alpha^1 S2^{-1} \Delta,$$
$$d2 = \alpha^2 S2^{-1}[I-(\Delta^t S2^{-2}\Delta)/(\Delta^t S2^{-3}\Delta)S/2^{-1}]\Delta \qquad (2)$$

where $\alpha^1$ and $\alpha^2$ are normalization coefficients, $\Delta$ is $X^1-X^2$ (the differential spectrum between class 1 and class 2), and I is a unit matrix.

To project each data item on the space composed of the classification spectrums d1 and d2 thus obtained, the inner product of the classification spectrum and the reflected spectral spectrum of the object is found.

If the reflected spectral spectrum of the object is expressed as $f(\lambda)$ ($\lambda$=wavelength), the inner products t1 and t2 are expressed by the following equation (3):

$$t1 = f(\lambda) \cdot d1$$
$$t2 = f(\lambda) \cdot d2 \qquad (3)$$

where · indicates inner product operation.

In the prior art as disclosed in Jpn. Pat. Appln. KOKAI Publication No. 3-267726, a classification boundary is determined from the values of t1 and t2 as shown in FIG. 32 and a filter having the spectrum characteristic is realized using a diffraction grating and a liquid-crystal filter 2 as shown in FIG. 33.

In FIG. 33, reference numeral 3 indicates a light-source lamp.

The classification spectrums d1 and d2 are generally complex in shape as shown in FIG. 34 and the accuracy with which the diffraction grating 1 and liquid-crystal filter 2 are mounted must be high because the spectrums take positive and negative values.

The prior-art system as disclosed in Jpn. Pat. Appln. KOKAI Publication No. 3-267726 has disadvantages in that: (i) because the system restricts the light source to a particular type, it is not suited for classification with a different light source and cannot achieve effective classification when the spectrum of the light source varies; and (ii) the diffraction grating used is expensive.

To overcome these disadvantages, the assignee of the present invention has filed Japanese Patent Application No. 6-241614, which discloses an invention related to a color classifying apparatus that classifies the colors of objects using the multispectral images obtained via a plurality of band-pass filters. This system has a simplified configuration, reduced cost, and better resistance to mechanical vibration, and is also capable of classifying the colors of objects well without limiting the light source even when its spectrum varies.

As a color nonuniformity checking apparatus that checks objects for color nonuniformity, a spectroscope or a color difference meter have been used. In addition, color nonuniformity has been checked on the basis of the RGB input from a color video camera.

In the color classifying apparatus disclosed in Japanese Patent Application No. 6-241614, however, since classification judgment is made by only one type of classification judgment method, the apparatus has left much room for improvement with respect to the accuracy of classification.

Specifically, with only one type of classification judgment method, the performance of classification judgment decreases seriously, depending on the state of the distribution in a multidimensional space of a plurality of objects subjected to the classification judgment. The classification performance tends to deteriorate, depending on the object.

Furthermore, when an object is checked for color nonuniformity with a conventional spectroscope or a color difference meter, it is impossible to check the object for color nonuniformity through one measurement because only spot measurement can be made.

In this case, if measurement is made several times, variations will take place in each measurement, so that the color nonuniformity of the object cannot be determined accurately.

Furthermore, when color nonuniformity is checked for on the basis of the RGB input from a color video camera, it is difficult to sense a subtle color difference because of the characteristics of the color filter used, so that the color nonuniformity of the object cannot be checked accurately.

SUMMARY OF THE INVENTION

Accordingly, an object of the present invention is to provide a color classifying apparatus which performs the process of classifying the colors of objects using the multispectral images obtained via a plurality of band-pass filters, simplifies the configuration, reduces cost, withstands mechanical vibration, and is capable of classifying the colors of objects well without limiting the light source even when its spectrum varies, and which is capable of further improving the classification accuracy by using a classification judgment method most suitable for making a classification judgment on objects.

Another object of the present invention is to provide a color nonuniformity checking apparatus which performs the process of checking objects for color nonuniformity using the multispectral images obtained via a plurality of band-pass filters, simplifies the configuration, reduces cost, withstands mechanical vibration, and is capable of checking objects for color nonuniformity well without limiting the light source even when its spectrum varies, and which is capable of improving the accuracy in checking object for color nonuniformity.

The foregoing object is accomplished by providing a color classifying apparatus comprising: imaging means for imaging the reflected light from an object; optical means for forcing the reflected light from the object to form multispectral images each having a different band on the imaging means; and classifying means for computing a classification spectrum for classification using a statistical approach from the multispectral image data on the object imaged by the imaging means and classifying the object into a plurality of classes using the classification spectrum, wherein the classifying means includes a classification computing section that makes a classification judgment on all of the combinations of two of the plurality of classes by one type of classification judgment method, and a classification deciding section that comprehensively judges a result of classification judgment on each combination of two classes from the classification computing section.

The foregoing object is also accomplished by providing a color classifying apparatus comprising: imaging means for imaging the reflected light from an object; optical means for forcing the reflected light from the object to form multispectral images each having a different band on the imaging means; and classifying means for computing a classification spectrum for classification using a statistical approach from the multispectral image data on the object imaged by the imaging means and classifying the object into a plurality of classes using the classification spectrum, wherein the classifying means includes a plurality of classification judging sections that make a classification judgment on the plurality of classes by a plurality of types of classification judgment method that differ from each other.

The foregoing object is further accomplished by providing a color classifying apparatus comprising: multispectral image shooting means that images the reflected light from an object as multispectral images each having a different band; image select means that extracts feature amounts from the multispectral image data of the object shot by the multispectral image shooting means and selects and outputs only the multispectral image data items whose feature amount extracted is greater than a specific value; and classifying means that computes a classification spectrum for classification using a statistical approach from the multispectral image data selected by the image select means and classifies the object using the classification spectrum.

With the color classifying apparatuses of the present invention, for example, a plurality of bandpass filters each having a different band are each provided between an object and the imaging means and an multispectral image of the reflected light from the object is shot.

The classifying means computes a classification spectrum for classification using a statistical approach from the spectral image data of the objects shot by the imaging means and classifies the objects using the classification spectrum.

In this case, the classifying means makes classification for all of the combinations of two of a plurality of classes by only one type of classification judgment method or by a plurality of types of classification judgment method, thereby enabling a highly accurate classification judgment most suitable for classification of objects.

Furthermore, by providing image select means that selects only the multispectral image data whose feature amount is greater than a specific value, in the stage precedent to the classifying means, it is possible to reduce the processing data amount and achieve a high-speed, highly accurate classification judgment.

The foregoing object is further accomplished by providing a color nonuniformity checking apparatus comprising: multispectral image providing means for providing multispectral image data for an object; feature amount extracting means for extracting feature amounts from the multispectral image data from the multispectral image providing means; color nonuniformity judging means for making a color nonuniformity judgment according to the feature amounts from the feature amount extracting means; and judgment result output means for outputting a color nonuniformity judgment result according to a color nonuniformity judgment result from the color nonuniformity judgment means.

BRIEF DESCRIPTION OF THE DRAWINGS

FIG. 2 is a rotational color filter used in the basic embodiment of the present invention;

FIG. 13 is a flowchart for the processing in the third embodiment;

FIGS. 15A and 15B are flowcharts for the process of sensing color nonuniformity in the fourth embodiment;

FIG. 20 is a block diagram showing the basic configuration of a color nonuniformity checking apparatus according the present invention;

FIG. 21 is a block diagram of a color nonuniformity checking apparatus according to a seventh embodiment of the present invention;

FIG. 22 is a block diagram of a color nonuniformity checking apparatus according to an eighth embodiment of the present invention;

FIG. 23 is a block diagram of a color nonuniformity checking apparatus according to a ninth embodiment of the present invention;

FIG. 24 is a flowchart for the processing in the important part of the color nonuniformity checking apparatus of the ninth embodiment;

FIG. 27 is a block diagram of a color nonuniformity checking apparatus according to a tenth embodiment of the present invention;

FIG. 28 is a block diagram of a color nonuniformity checking apparatus according to an eleventh embodiment of the present invention;

DETAILED DESCRIPTION OF THE PREFERRED EMBODIMENTS

Before explanation of embodiments of the present invention, the basic principle of the present invention and its basic embodiment disclosed in Japanese Patent Application No. 6-241614 noted earlier will be explained.

(Basic Principle)

With the present invention, a simple, low-cost color classifying apparatus is realized by processing the multispectral images obtained using as color classification filters a plurality of band-pass filters that each transmit a specific wavelength.

To perform color classification even under a different light source, the effect of the light source (illumination light) is removed by measuring the reflected spectral spectrum of a suitable reference plate under the same conditions as when an object is shot and correcting the reflected spectral spectrum of the object on the basis of the reflected spectral spectrum of the reference plate.

Specifically, if $\lambda$ is a wavelength, the reflected spectral spectrum of the object is $f(\lambda)$, the reflected spectral spectrum of the reference plate is $s(\lambda)$, the reflected spectral spectrum of illumination light is $L(\lambda)$, the sensitivity spectrum of the shooting system (including the transmission spectrum of the shooting lens and the sensitivity spectrum of the imaging element) is $M(\lambda)$, the shooting spectrum $gi(\lambda)$ of the object and the shooting spectrum $gs(\lambda)$ of the reference plate will be expressed respectively as:

$$gi(\lambda)=f(\lambda)\times L(\lambda)\times M(\lambda)$$

$$gs(\lambda)=s(\lambda)\times L(\lambda)\times M(\lambda)$$

and the spectrum of the object $gi'(\lambda)$ will be expressed as:

$$gi'(\lambda)=gi(\lambda)/gs(\lambda)=f(\lambda)/s(\lambda) \qquad (4)$$

By using the spectrum $gi'(\lambda)$ from which the effect of the reflected spectral spectrum of illumination light has been removed, color classification can be carried out even under a different light source.

Furthermore, when the luminance of the illumination light is different, the power of signal $gi'(\lambda)$ in divisional equation (4) is normalized.

A basic embodiment of the present invention based on the aforementioned basic principle will be described by reference to the accompanying drawings.

(Basic Embodiment)

Figure 3:
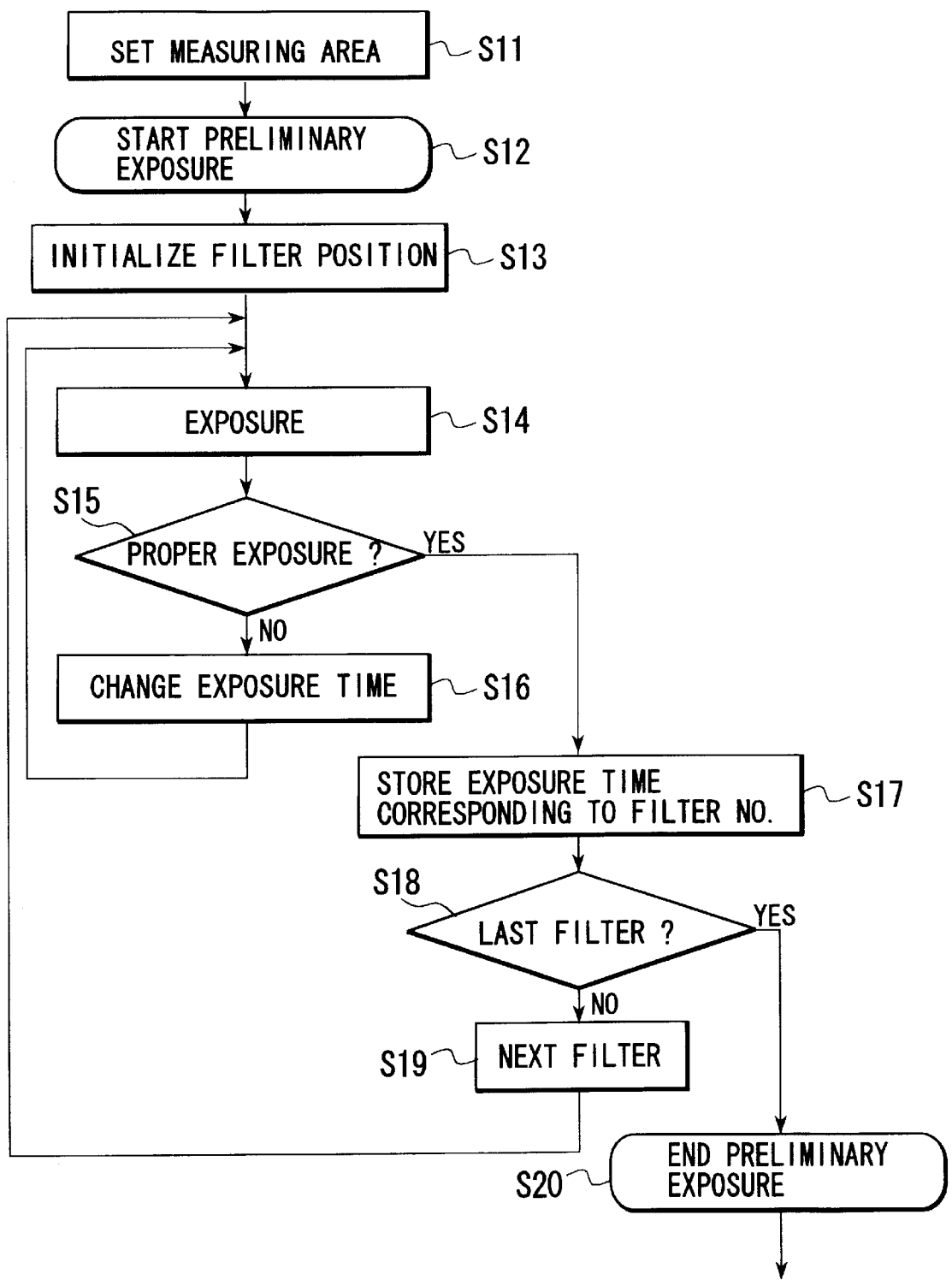
FIG. 3 is a flowchart to help explain the operation of the basic embodiment of the present invention.

A general-purpose basic embodiment of the present invention will be explained by reference to FIGS. 1 to 3.

Figure 1:
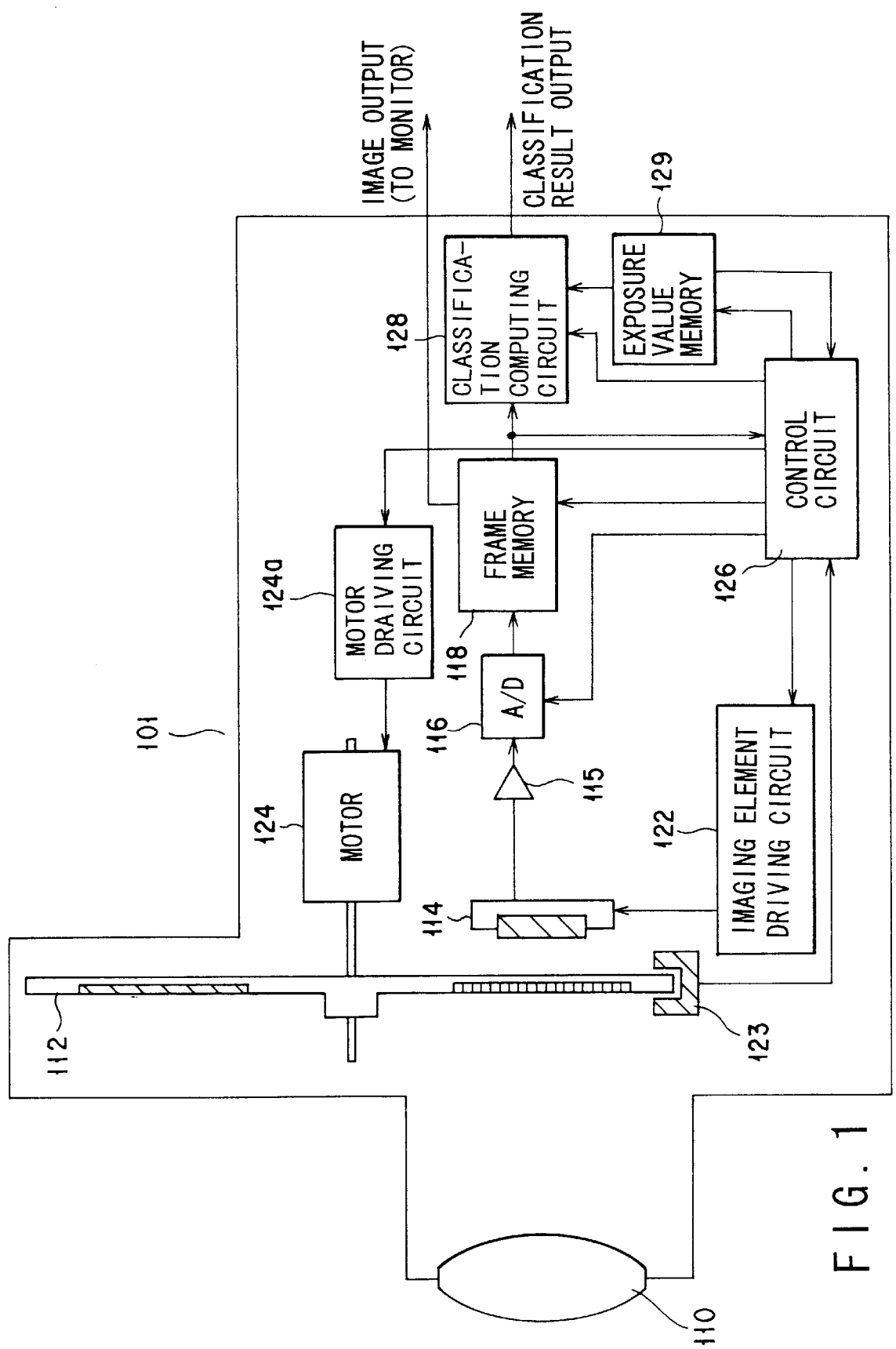
FIG. 1 is a block diagram of a color classifying apparatus according to a basic embodiment of the present invention.

As shown in FIG. 1, a color classifying apparatus according to the basic embodiment comprises a housing 101, an optical system 110 including a lens, a rotational color filter 112 composed of a plurality of band-pass filters 112A, 112B, . . . , 112E, a filter position sensor 123, a motor 124, a motor driving circuit 124a, an imaging element 114, such as a CCD, for taking in the multispectral images of objects and a reference plate, an amplifier 115, an imaging element driving circuit 122, an A/D converter 116, a frame memory 18, a classification computing circuit 128, an exposure value memory 129 for storing the exposure time of the imaging element 14 that provides the proper exposure for each of the band-pass filters, and a control circuit 126.

In the rotational color filter 112, filter position sensing holes 125A, 125B, ..., 125E and a filter initial position sensing hole 126 are made as shown in FIG. 2.

The position of each of the band-pass filters 112A, 112B, ..., 112E is sensed by sensing the initial position sensing hole 126 and filter position sensing holes 125A, 125B, ..., 125E with the filter position sensor 123 composed of, for example, a photointerrupter.

In response to the signal from the filter position sensor 123, the control circuit 126 controls the motor driving circuit 124a so that the rotation of the rotational color filter 112 may be synchronized with the imaging timing of the imaging element 114.

The images passed through the individual band-pass filters 112A, 112B, ..., 112E are focused on the imaging element 114, which converts them into electric signals.

The electric signals are amplified at the amplifier 115, which supplies the amplified signals to the A/D converter 116, which then converts them into digital signals. Thereafter, the converted signals are stored in the frame memory 118 as multispectral image data items.

The frame memory 118 sends not only all of the multispectral image data to an external monitor (not shown) but also the data in a specific area of the image to the classification computing circuit 128.

Next, the operation of the basic embodiment will be described by reference to the flowchart of FIG. 3.

First, the measuring area of an object is set (step S11).

Next, a first band-pass filter (band-bass filter 112A) in the rotational color filter 112 is set and preliminary exposure is made so that the resulting measurement data may lie in a specific range of values.

Then, the exposure time of the imaging element 14 at that time, together with the number of the corresponding band-pass filter, is stored in the exposure value memory 129 (steps S12 to S17).

Such preliminary exposure is made for all of the remaining band-pass filters (band-pass filters 112B, 112E) in sequence (steps S18 to S20).

At the time of measurement after such preliminary exposure has finished, objects are shot by changing the exposure time of the imaging element 114 in synchronization with each of the band-pass filters 112A, 112B, ..., 112E.

At this time, on the basis of the exposure times of the imaging element 14 stored by band-pass filter in the exposure value memory 129, the classification computing circuit 128 corrects the measurement data item on the corresponding band-pass filter among the multispectral image data items and then performs classification computation.

As described above, with the basic embodiment, because the exposure memory 129 for storing the exposure times of the imaging element 14 is provided and the shooting is effected with the optimum exposure for each band-pass filter, the SNR (signal-to-noise ratio) of the measurement data is improved even with the simple configuration and therefore the accuracy of classification increases.

Furthermore, with the basic embodiment, because preliminary exposure enables measurement with the optimum exposure for each band-pass filter, classification is effected with high accuracy even when the object to be measured varies, so that a general-purpose color classifying apparatus can be realized.

Since the basic embodiment controls the exposure time of the imaging element, this helps simplify the circuit configuration.

Figure 4A:
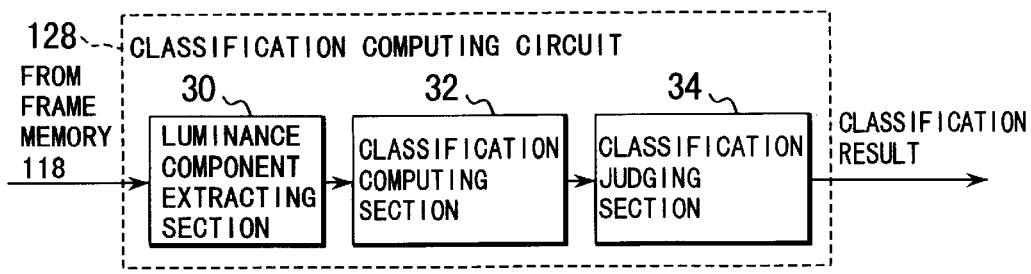
FIGS. 4A, 4B, and 4C are a block diagram of a classification computing circuit in the basic embodiment of the present invention, a block diagram of a classification computing section in the basic embodiment, and a block diagram of a classification spectrum select circuit in the basic embodiment, respectively.

A concrete example of the classification computing circuit 128 for performing classification computation of multiple classes in the basic embodiment will be described by reference to FIGS. 4A, 4B, and 4C.

In the case of classification into, for example, four classes, class 1 to class 4, by the FS transform method in classification computation of multiple classes, when class 2 and class 3 are projected on the space formed by the classification spectrums computed using the data in class 1 and class 4, the boundary between classes, such as class 1 and class 2 or class 3 and class 4, may be vague, resulting in a decrease in the classification accuracy.

The classification computing circuit 123 does not decrease the classification accuracy even in the case described above and provides effective classification.

The classification computing circuit 128 comprises a luminance component extracting section 30, a classification computing section 32, and a classification judging section 34.

First, the configuration of the classification computing section 32 will be explained by reference to FIG. 4B.

Figure 4B:
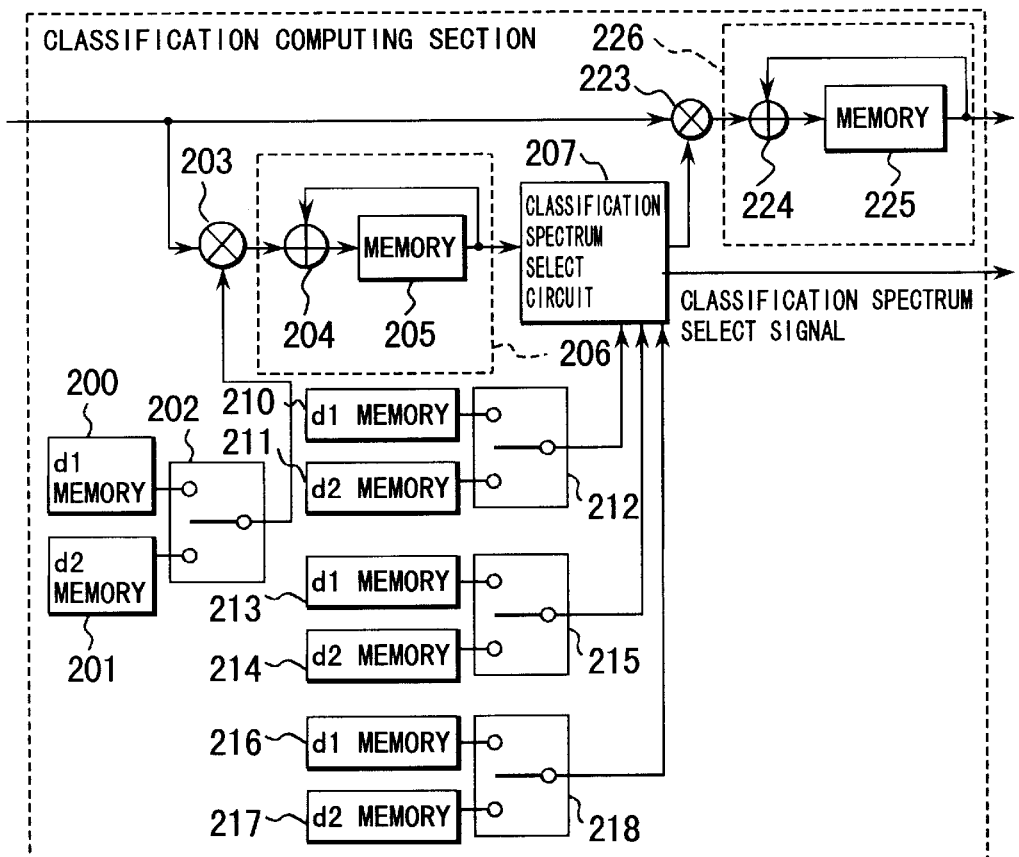

As shown in FIG. 4B, the classification computing section 32 comprises a d1 memory 200 and a d2 memory 201 that store classification spectrums d1 and d2, respectively, a selector 202 that switches between the outputs of the d1 memory 200 and d2 memory 201, a multiplier 203 that calculates the product of the classification spectrums d1 and d2 and the spectrum data from an unknown object, an accumulative adder 206 composed of an adder 204 and a memory 205, a d1 memory 210 and d2 memory 211, a d1 memory 213 and d2 memory 214, and a d1 memory 216 and d2 memory 217 that store classification spectrums, a selector 212 that switches between the outputs of d1 memory 210 and d2 memory 211, a selector 215 that switches between the outputs of d1 memory 213 and d2 memory 214, and a selector 218 that switches between the outputs of d1 memory 216 and d2 memory 217, a classification spectrum select circuit 207 that selects one of three classification spectrums on the basis of the signal from the accumulative adder 206, a multiplier 223 that calculates the product of the selected classification spectrum and the spectrum data from the unknown object, and an accumulative adder 226 composed of an adder 224 and a memory 225.

Now, the operation of the classification computing section 32 will be explained. The number of classes in the classification is assumed to be four, class 1 to class 4.

It is assumed that the four classes are distributed in almost ascending order in a multidimensional space.

The classification spectrums $d1_{1-4}$ and $d2_{1-4}$ computed from the learning data for class 1 and class 4 have been stored in d1 memory 200 and d2 memory 201, respectively.

Furthermore, the classification spectrums $d1_{1-2}$ and $d2_{1-2}$ computed from the learning data for class 1 and class 2 have been stored in d1 memory 210 and d2 memory 211, respectively. The classification spectrums $d1_{2-3}$ and $d2_{2-3}$ computed from the learning data for class 2 and class 3 have been stored in d1 memory 213 and d2 memory 214, respectively. The classification spectrums $d2_{3-4}$ and $d2_{3-4}$ computed from the learning data for class 3 and class 4 have been stored in dl memory 216 and d2 memory 217, respectively.

First, in the classification computing section 32, the multiplier 203 calculates the product of the unknown data on the object from the luminance component extracting section 30 and the classification spectrum $d1_{1-4}$ from the d1 memory 200 with respect to each component (dimension).

The products for the individual components are added together at the accumulative adder 206 and the result is inputted to the classification spectrum select circuit 207.

The output of the accumulative adder 206 results in the inner product of the unknown data and the classification spectrum.

Then, the selector 202 is switched and similarly the inner product is calculated for the d2 memory 201. The result is sent to the classification spectrum select circuit 207.

Figure 4C:
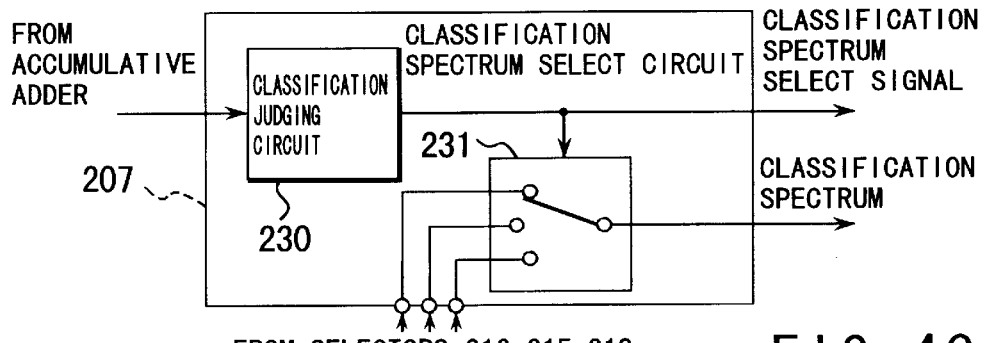

As shown in FIG. 4C, the classification spectrum select circuit 207 is made up of a classification judging circuit 230 and a selector 231. Receiving the inner product from the accumulative adder 206, the select circuit 207 causes the classification judging circuit 230 to make a rough classification judgment.

In the judging circuit, the unknown data is projected on the space formed by the classification spectrums $d1_{1-4}$ and $d2_{1-4}$ computed from the data on class 1 and class 4 and its class is determined by the predetermined classification boundary.

Here, the boundary is determined so as to divide into three new classes, "close to class 1 from class 2", "between class 2 and class 3" and "close to class 4 from class 3."

When the classification spectrum select signal, the output of the classification judging circuit 230, is "close to class 1 from class 2," the selector 231 will output the input from the selector 212 as a classification spectrum.

As a result, the classification spectrums $d1_{1-2}$ and $d2_{1-2}$ are selected and the inner product of these spectrums and the unknown data is calculated at the multiplier 223 and the accumulative adder 226. The resulting inner products, together with the classification spectrum select signal from the classification spectrum select circuit 207, are sent to the classification judging section 34, which decides a final class.

When the classification spectrum select signal, the output of the classification judging circuit 230, is "between class 2 and class 3," the selector 231 will output the input from the selector 215 as a classification spectrum. When it is "close to class 4 from class 3," the selector 231 will output the input from the selector 218 as a classification spectrum.

This enables the optimum classification spectrum to be selected and the inner product is calculated.

While in the basic embodiment, what is obtained from the data on class 1 and class 4 is used as the classification spectrum at the first stage, the classification spectrum obtained from the data on class 2 and class 3 may be used, because the data on the two classes at both ends of the distribution is not necessarily used.

Furthermore, class 1 and class 2 may be put together to define a new class 1', and class 3 and class 4 be put together to define a new class 4', and the classification spectrum calculated using the data on class 1' and class 4' may be used.

While in the basic embodiment, classification judgment is made at two stages, it may be made at three or more stages according to the number of classes in classification, which will give the same effect.

With the basic embodiment, the configuration of performing classification judgment at multiple stages enables effective classification without decreasing the classification accuracy even in dividing into multiple classes.

Since the basic embodiment, however, uses only one type of classification judgment method, such as the FS transform method, the performance of classification judgment may drop significantly, depending on the distribution of objects of classification judgment in a multidimensional space. The classification performance may deteriorate for some objects.

Accordingly, to improve the basic embodiment further, the present invention uses a classification judgment method best suitable for making a classification judgment on objects.

Hereinafter, embodiments of the present invention designed from such a viewpoint will be explained, referring to the accompanying drawings.

(A first embodiment)

A first embodiment of the present invention will be explained by reference to FIGS. 5 to 9. The first embodiment is such that the performance of classification of objects is improved by making a judgment between all of the combinations of two of a plurality of classes by one type of classification judgment method and then making a comprehensive judgment.

Namely, with the first embodiment, a classification judgment is made between two classes by one type of classification judgment method as many times as the number of all of the combinations of two of the plurality of classes. Thereafter, the results of the classification judgment between two classes in each combination are judged comprehensively.

Figure 5:
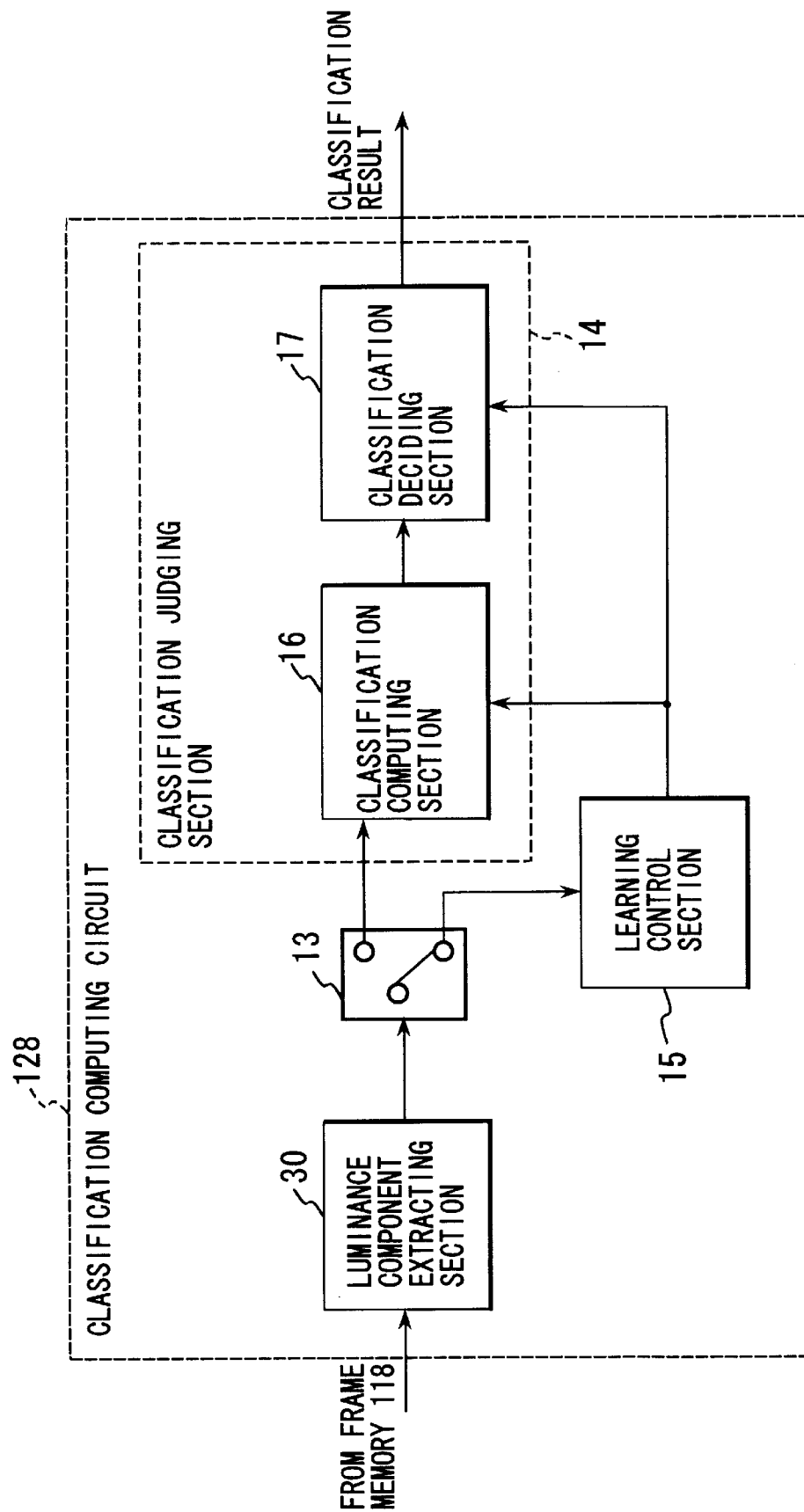
FIG. 5 is a block diagram of a color classification computing circuit according to a first embodiment of the present invention.

As shown in FIG. 5, with the first embodiment, the performance of classification of objects can be improved by providing a classification deciding section 17 in the classification computing circuit 128 in a color classifying apparatus using a plurality of bandpass filters as described in the basic embodiment.

The classification computing circuit 128 comprises a luminance component extracting section 30 that extracts the luminance components in the measuring area from the multispectral image data obtained as described earlier, and a classification judging section 14 that makes a judgment between all of the combinations of two of a plurality of classes by one type of classification judgment method on the basis of the luminance components obtained by the classification computing circuit 128 and then making a comprehensive judgment.

The classification judging section 14 of the first embodiment comprises a classification computing section 16 that makes a classification judgment between all of the combinations of two of the plurality of objects, and a classification deciding section 17 that judges the results of classification judgment between two classes in each combination from the classification computing section 16.

The classification computing circuit 128 outputs the results of classification for the input image data.

In the classification computing circuit 128, the learning control section 15 has stored the data obtained via a switch 13 by learning each image data item as much as necessary. These learning data items are used in the classification judgment process at the classification judging section 14.

Figure 6:
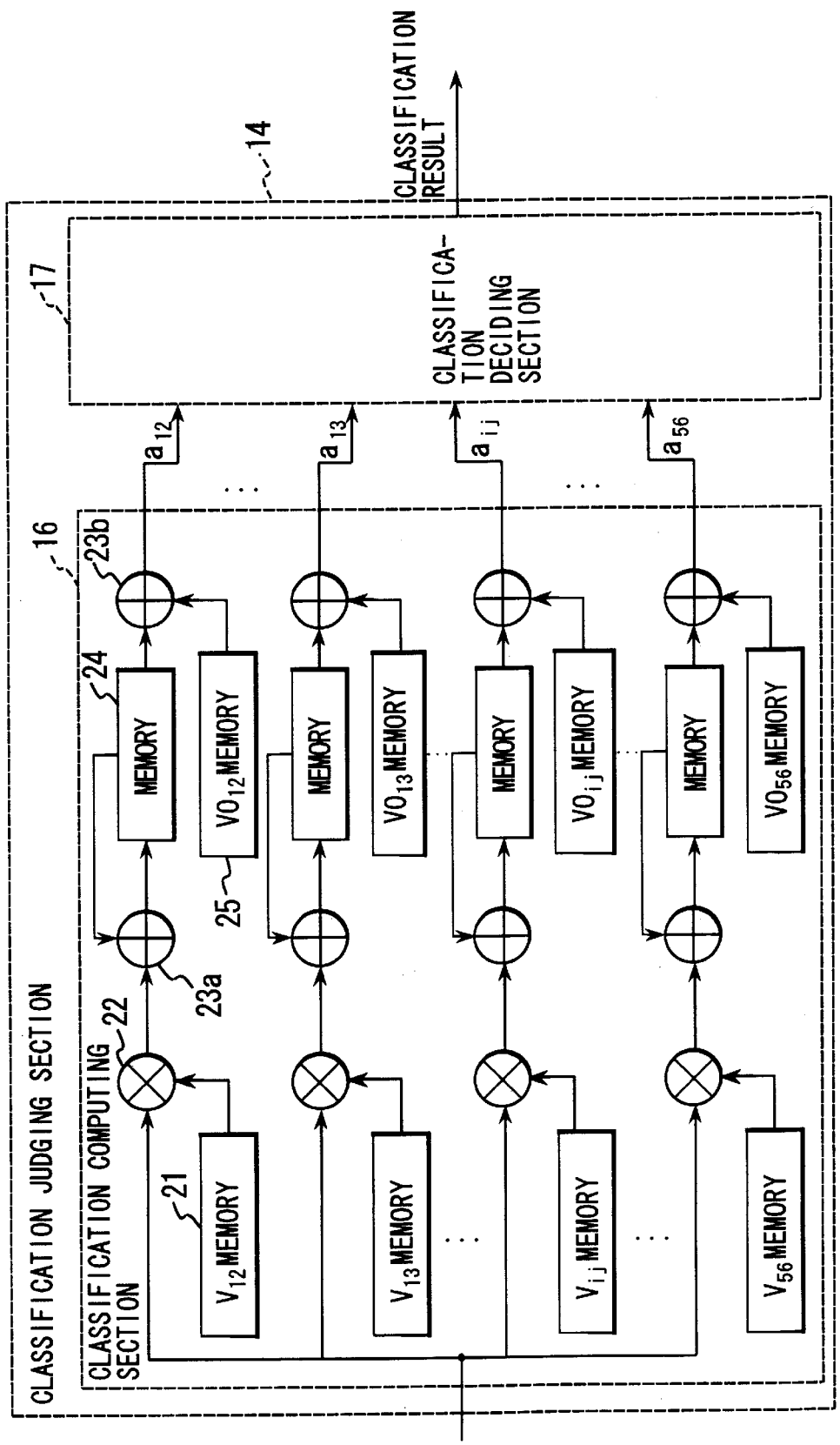
FIG. 6 is a block diagram of a classification judging section according to the first embodiment.

FIG. 6 shows the classification judging section 14 composed of the classification computing section 16 and the classification deciding section 17 as an example of classification judgment in six classes.

The classification computing section 16 is provided with a plurality of $V_{ij}$ memories 21 that store classification vectors $V_{ij}$ of class i and class j, a plurality of $V_{oij}$ memories 25 that store offset values $V_{oij}$ of class i and class j, a plurality of operation units 22, 23a, and 23b, and a plurality of memories 324.

In this case, the number of $V_{ij}$ memories 21, that of $V_{oij}$ memories 25, that of operation units 22, 23a, 23b, and that of memories 24 are each 15 for the case where classification judgment is made on each combination of two of six classes (15=6*(6−1)/2).

After the inner product of the inputted unknown data and classification vector $V_{ij}$ has been calculated, offset value $V_{oij}$ is added to the inner product and the result $a_{ij}$ is sent to the classification deciding section 17.

The calculations for the inner product and addition are made in parallel using the 15 classification vectors.

A $V_{12}$ memory 21 and a $V0_{12}$ memory 25 store a vector for classifying into class 1 and class 2 and its offset V0, respectively.

In FIG. 6, because of an example of dividing into six classes, there are as many memories as there are combinations of two of all classes, that is, the number of memories 21 and that of memories 25 are each 15 for each of V12, V13, and V14 to V56.

Those memory data items are projected as classification vector $V_{ij}$ and its offset value $V_{oij}$ onto the unknown data. The individual data items are supplied to the operation units 22, 23a, and 23b, and the memories 24, which perform an internal product operation and offset operation and output the results $a_{ij}$ including $a_{12}$, $a_{13}$, and $a_{14}$ to $a_{56}$.

Figure 7:
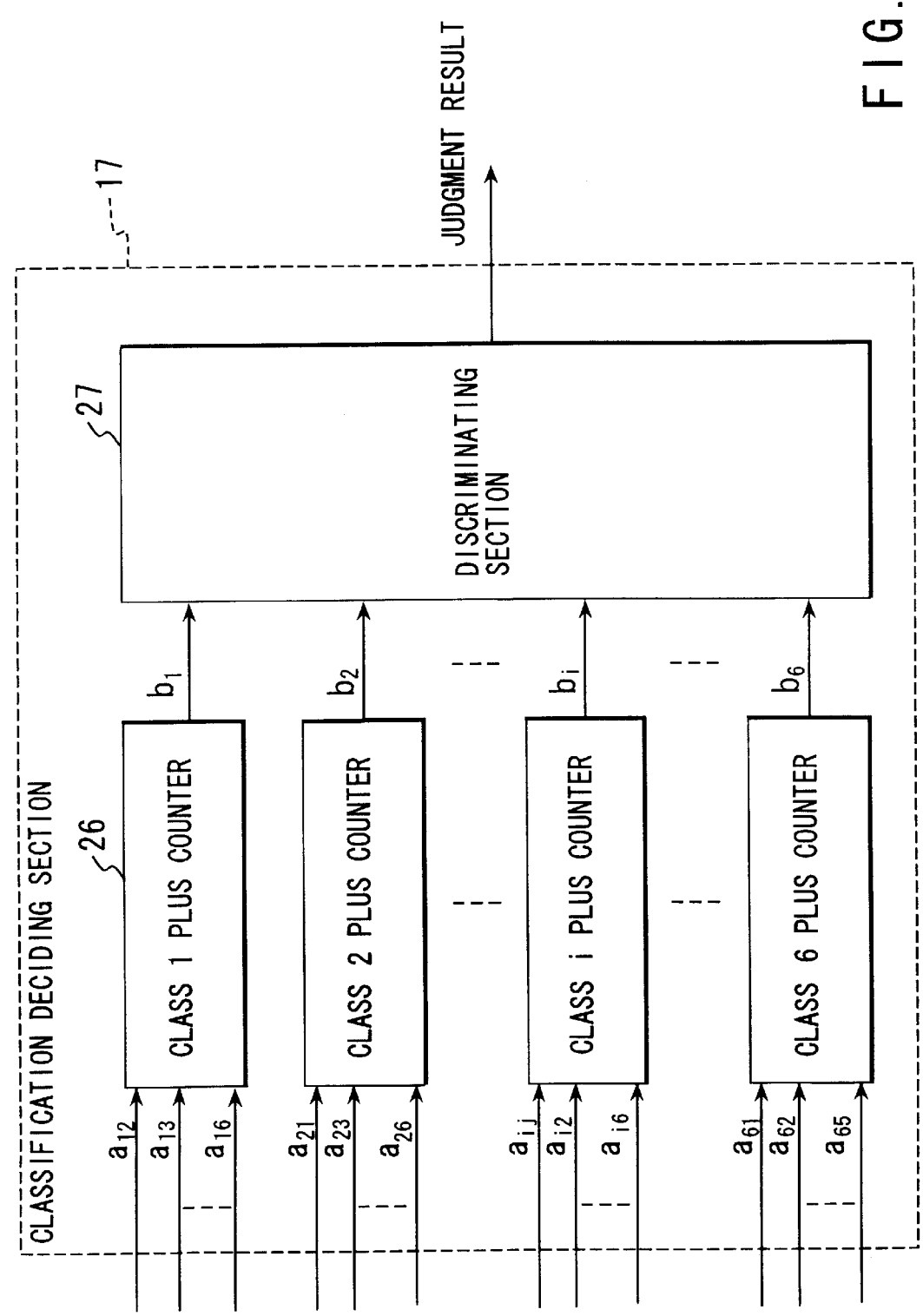
FIG. 7 is a block diagram of a classification deciding section according to the first embodiment.

FIG. 7 is a block diagram of the classification deciding section 17.

A class i plus counter 26 that defines $a_{ij}=-a_{ji}$ checks the judgment result "a" concerning all classes i sent from the classification computing section 16 for sign, counts the number bi of results that take the plus sign, and outputs the count.

A discriminating section 27 checks the maximum value of the number bi of results that take the plus sign and comprehensively determines class i for which the number bi takes the maximum value.

The classification deciding section 17 has six plus counters 26 in total, a class 1 plus counter, a class 2 plus counter, and a class i plus counter to a class 6 plus counter.

The class 1 plus counter 26 judges whether each of the inputs related to class 1 ranging from input a12, input a13 to input a16 is positive or negative. If judging that it is positive, the counter counts the number of plus inputs.

Similarly, the class 2 plus counter 26 counts plus components of each of the inputs related to class 2 including inputs a21, a23, a24, a25, and a26.

Then, the discriminating section 27 checks the outputs b1 to b6 of the number of plus signs outputted from each plus counter 26 and determines a class for which the number takes the maximum value.

In the above explanation, a statistical approach is used in finding classification vector $V_{ij}$ and its offset value $V_{oij}$. FIGS. 6 and 7 show examples of using a linear identifying unit. Use of the linear identifying unit enables highly accurate classification judgment without reducing the number of dimensions.

Figure 8:
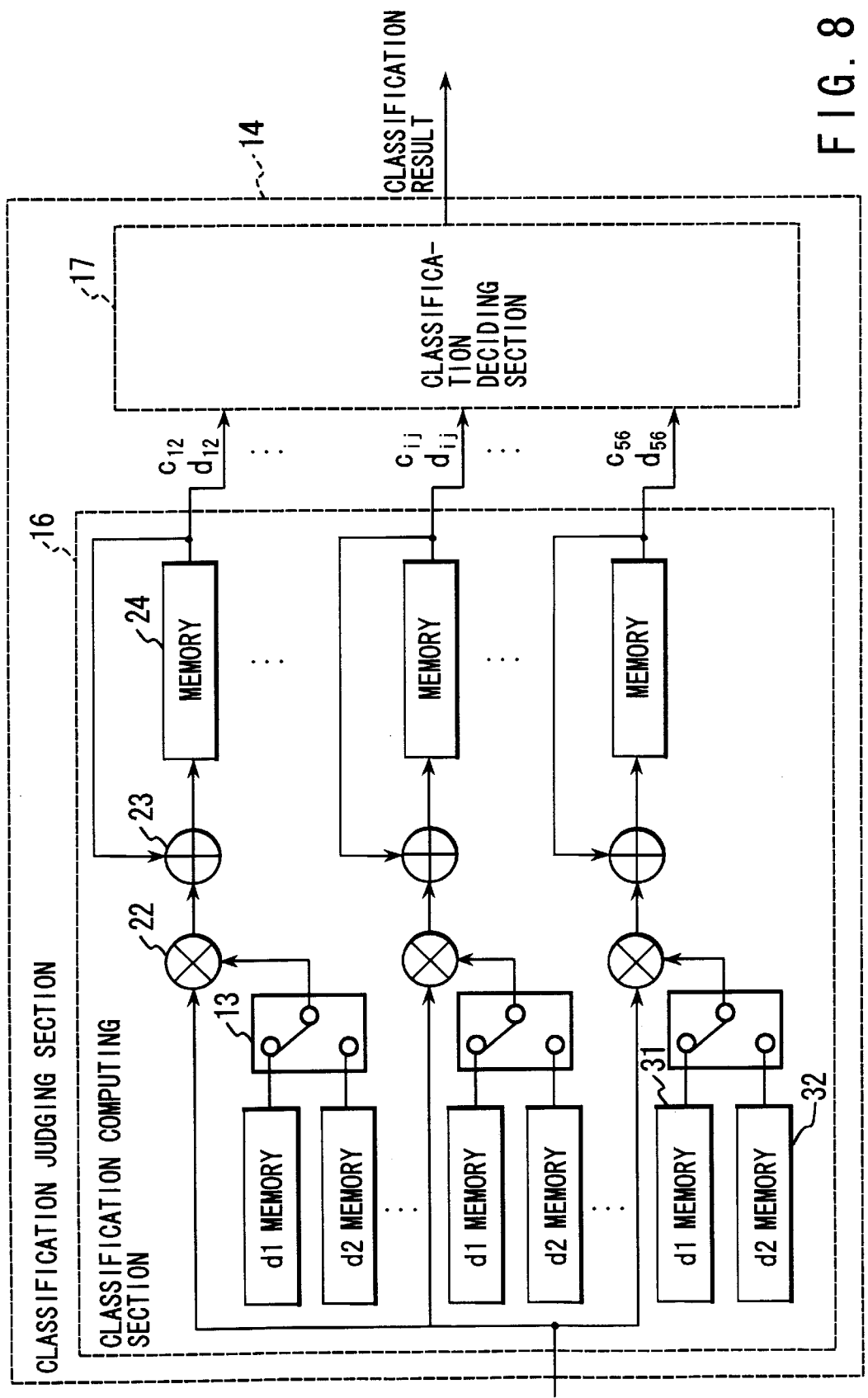
FIG. 8 is a block diagram of a modification of the classification judging section according to the first embodiment.
Figure 9:
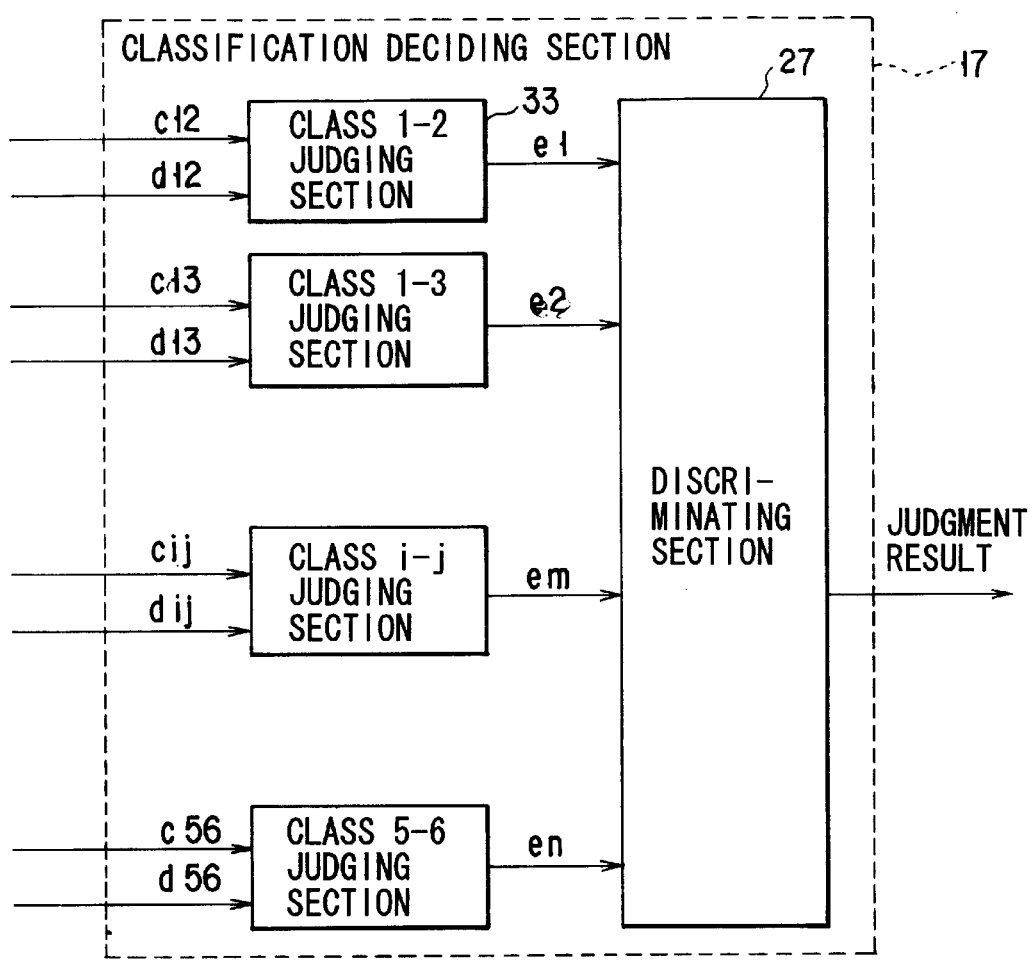
FIG. 9 is a block diagram of a modification of the classification deciding section according to the first embodiment.

FIGS. 8 and 9 show examples of performing FS transform and then using a shortest distance method. Since use of FS transform reduces the number of dimensions, computation can be done at high speeds.

Figures 10A, 10B:
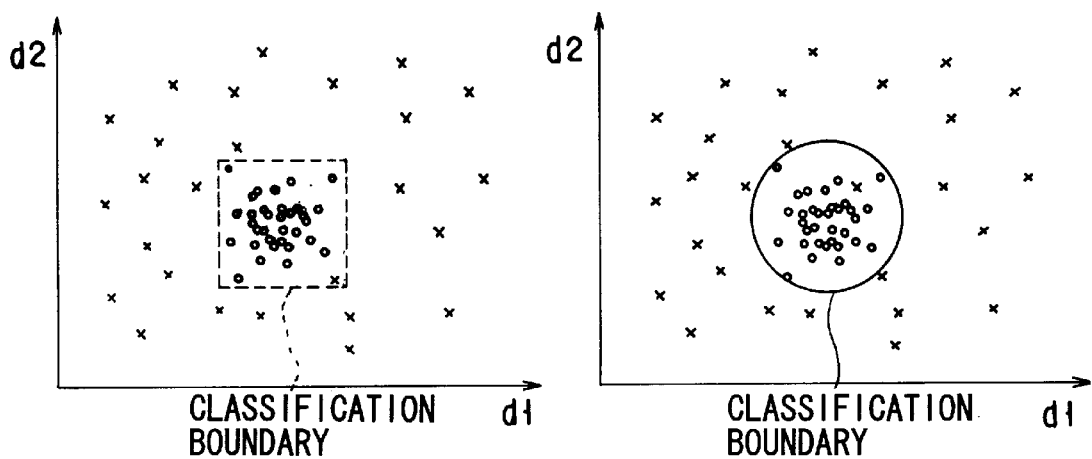
FIGS. 10A and 10B each show an example of the classification result in the first embodiment.

FIGS. 10A and 10B shows examples of the result of classification using classification vectors d1 and d2 that maximize the extended Fisher ratio (by Declustering Criterion method).

In FIGS. 8 and 9, there are a plurality of memories 331 and 332 for classification vectors d1 and d2 for FS transform. The switch 13 is used to switch between the plurality of d1 memories 331 and d2 memories 332. The operation unit 22 calculates the inner product of the inputted unknown data and classification vectors d1 and d2.

When d1 memory 331 is selected, the output C12 is supplied via the operation unit 23 and memory 24. When d2 memory 332 is selected, the output d12 is supplied via the operation unit 23 and memory 24.

In judgment by the FS transform, classification judgment is made on class 1 and class 2 on the basis of output c12 and output d12.

The classification vectors d1 and d2 that extremely separate class 1 and class 2 are stored in the d1 memory 331 and d2 memory 332, respectively.

The d1 memory and d2 memory supply the outputs $c_{ij}$ and $d_{ij}$, which means that the classification vectors d1 and d2 that extremely separate class i and class j exist in.

Then, the result of projection onto the d1 and d2 vectors that extremely separate the two classes in any one of all of the combinations of two classes is sent to the classification deciding section 17.

As shown in FIG. 9, the classification deciding section 17 for FS transform is provided with two-class judging sections 33 and a discriminating section 27, the two-class judging sections 33 including a class 1–2 judging section, a class 1–3 judging section, a class i-j judging section, and a class 5–6 judging section.

The judging sections 33 judges the distance between c12 and d12 thus obtained and class 1 and between c12 and d12 and class 2 and obtains a class closer to these outputs.

The result showing either class 1 or class 2 or either class 1 or class 3 is outputted as "en."Here, n is as large as there are combinations of two classes. In this case, because 5×6÷2=15, 15 outputs are produced.

The discriminating section 27 counts judgment results appeared most frequently and outputs a comprehensive judgment result.

In FIG. 8, instead of storing the vectors d1 and d2 that maximize the Fisher ratio in FS transform in dl memory 331 and d2 memory 332, a method that vectors to maximize the extended Fisher ratio may be described.

This approach is known as the Declustering Criterion method. Use of this method provides the classification results as shown in FIGS. 10A and 10B.

Vectors F1 and F2 are found by the Declustering Criterion method. When unknown data is projected on these vectors, such vectors as permit one of two classes to converge and the other to diverge are obtained.

In this case, the discriminating section 27 of FIG. 9 makes a judgment on the basis of the outputs of the individual judging sections 33 in a manner that obtains the classification boundary and determines whether a vector exists inside the boundary.

Then, a judgment is made on which of two classes of output e1 from the class 1–2 judging section and output e2 from the class 1–3 judging section the vector belongs to. On the basis of the judgment, the discriminating section 27 makes a comprehensive judgment.

In this case, the classification judging boundary has been determined by the learning control section 15 from the learning data on class 1 and class 2. The judging sections 33 judge whether a vector is inside or outside the boundary.

The declustering criterion method has been disclosed in, for example, "A Declustering Criterion for Feature Extraction in Pattern Recognition" by John Fehlaure and Bruce A. Eisenstein, IEEE Transaction on Computers. Vol. C-27, No. 3, March, 1978.

With the declustering criterion method, the configuration is the same as that in FIGS. 8 and 9 except that the class i-j judging sections 33 of FIG. 9 determine whether the unknown data is projected inside the classification boundary as shown FIGS. 10A and 10B and then make a judgment.

This approach is an effective classification judgment method when the average vectors of objects to be classified are close to each other in a multidimensional space.

With the first embodiment of the present invention, a classification judgment can be made more accurately, because two classes are selected at a time from a plurality of classes, a judgment is made in each selected set, and a comprehensive judgment is made in the end instead of making a judgment at once in a plurality of classes to be subjected to classification judgment.

(A second embodiment)

A second embodiment of the present invention which uses two types of classification judging sections to improve the performance of classification of objects will be explained by reference to FIG. 11.

Figure 11:
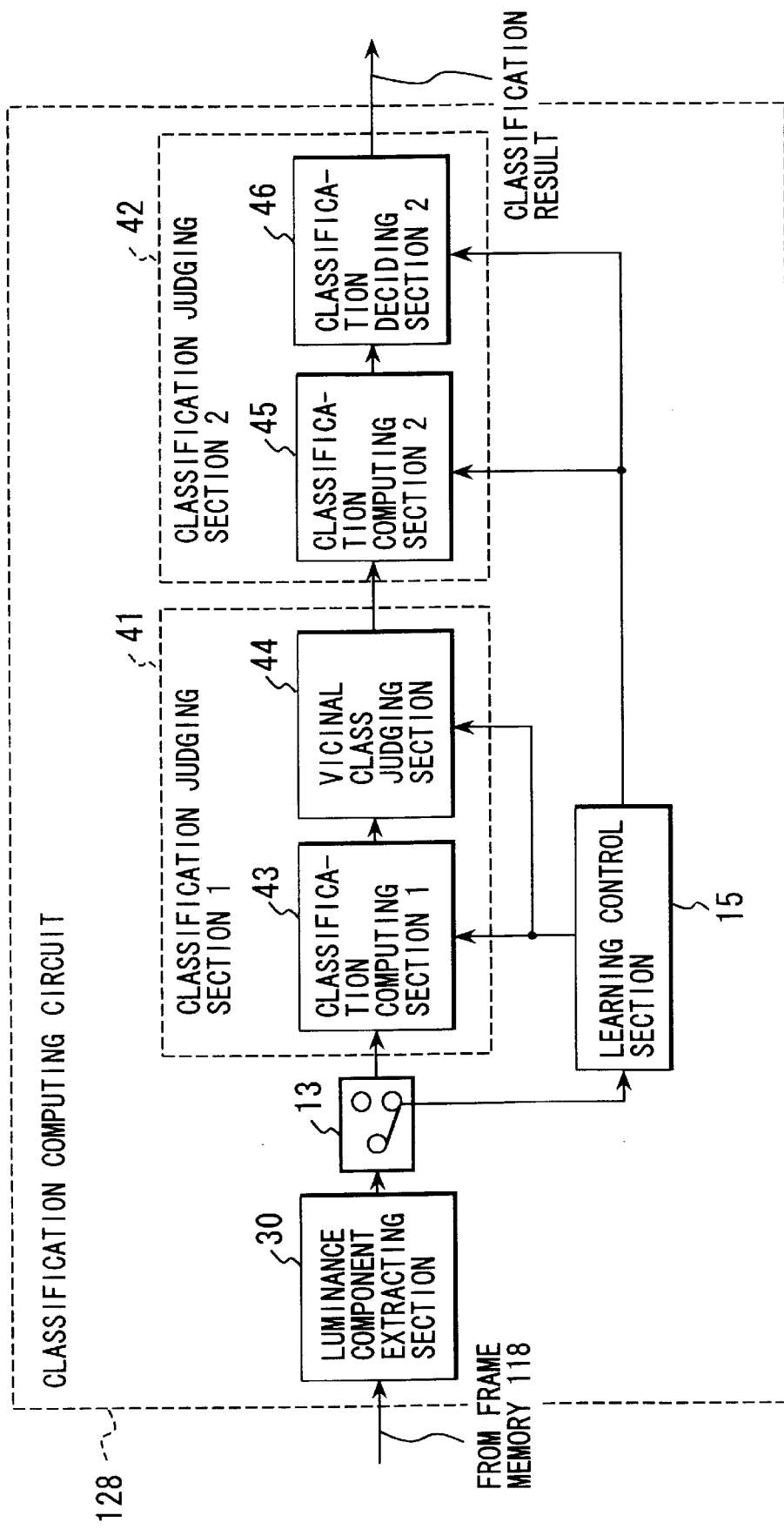
FIG. 11 is a block diagram of a color classification computing circuit according to a second embodiment of the present invention.

FIG. 11 shows the configuration of a color classifying apparatus according to a second embodiment of the present invention in which a classification judgment is made by a series connection of two types of classification judging sections 41 and 42.

To classify objects more accurately, two-class classifications are made, followed by a comprehensive judgment as explained in the first embodiment, or a classification judgment process is performed hierarchically to narrow down objects. In both methods, as the number of classes subjected to classification judgment increases, the processing time increases.

By first performing the shortest distance method whose processing scale is the smallest in the classification judgment processes to narrow down the classes to several vicinal ones and then carrying out the classification judgment process with high accuracy, the classification judgment process of objects can be performed at high speeds.

The classification computing circuit 128 of the second embodiment comprises a luminance component extracting section 30 that extracts luminance components to obtain color information on an area in the multispectral image shot using a plurality of bandpass filters, a first classification judging section 41 that first makes a classification judgment on the extracted data, and a second classification judging section 42 that makes a classification judgment on the result of the classification judging section 41 in a superimposing manner.

The classification judging section 41 is composed of a classification computing section 43 and a vicinal class judging section 44 that narrows down objects of classification.

The classification judging section 42 is made up of a classification computing section 45 and a classification deciding section 46 that decides classification.

In FIG. 11, the learning control section 15 is assumed to have the same function as in the first embodiment.

Therefore, the second embodiment is such that use of two types of classification judging sections improves the accuracy of classification.

In FIG. 11, the classification computing circuit 128 has a series connection of two classification judging sections 41, 42 after the stage where the luminance components have been extracted. The classification computing circuit is characterized by having a plurality of classification judging sections, and especially in that the first classification judging section 41 uses a classification judging method different from that used by the second classification judging section 42.

With the embodiment of FIG. 11, the first classification judging section 41 narrows down the classes to several vicinal ones and makes a judgment. Then, the second classification judging section 42 makes a classification judgment in the narrowed-down classes and produces a classification result.

With the second embodiment, when there are a lot of objects to be subjected to classification judgment, the first classification judging section 41 picks up only vicinal ones by such a simple process that obtains vicinal classes by distance, and then the second classification judging section 42 performs a highly accurate classification judgment using a piecewise linear discriminating unit as explained later. This speeds up the processing and enables a highly accurate judgment.

During learning, the luminance components are written as learning sample data into a learning data memory via the learning control section 15.

(A third embodiment)

Figure 12:
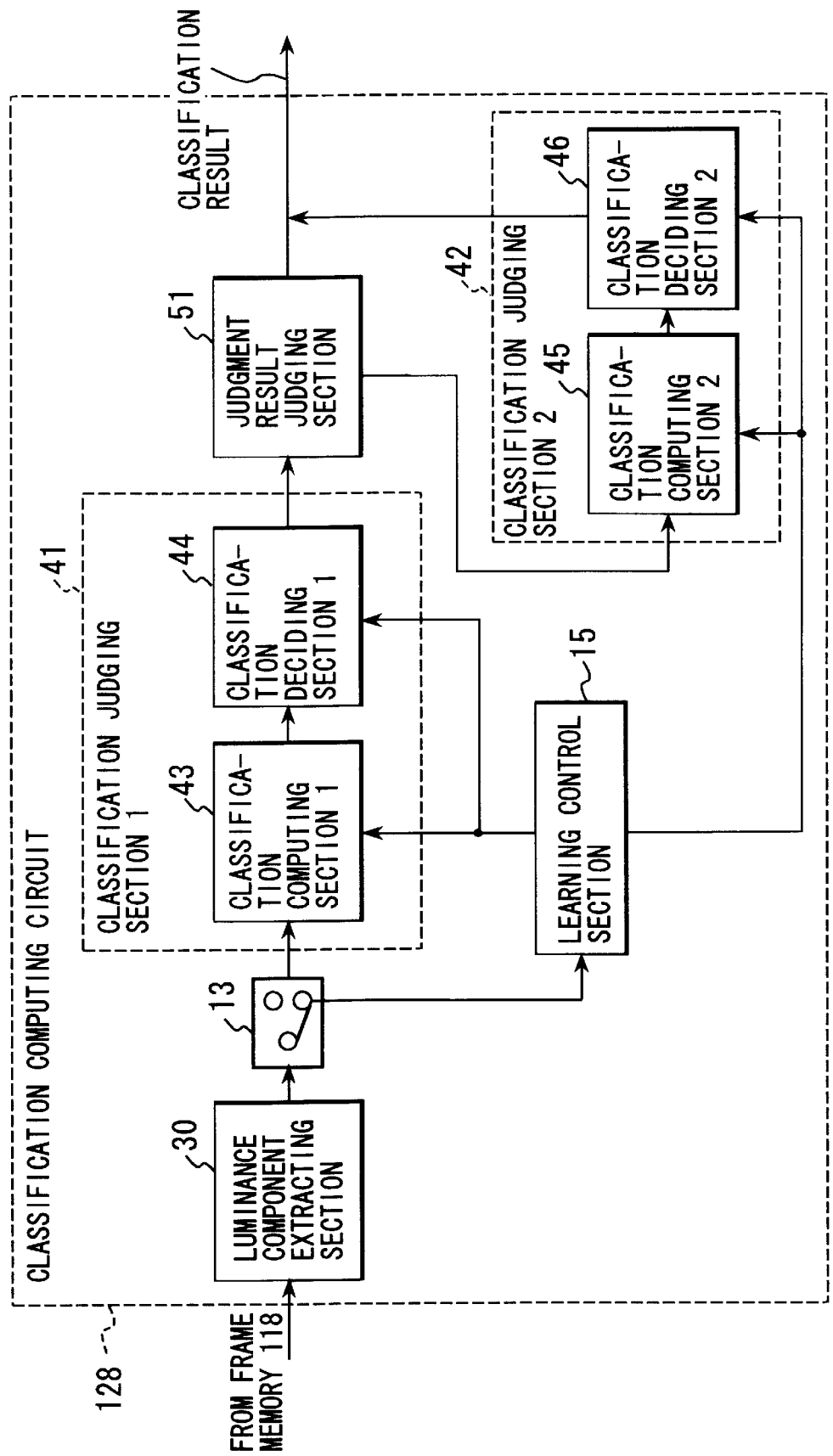
FIG. 12 is a block diagram of a color classification computing circuit according to a third embodiment of the present invention.

Referring to FIGS. 12 and 13, a third embodiment of the present invention will be explained which uses two types of classification judgment methods to improve the accuracy of classification of objects as in the second embodiment.

With the third embodiment, a judgment result judging section 51 is provided in the classification computing circuit 128 in a color classifying apparatus using a plurality of band-pass filters as shown FIG. 12. On the basis of the judgment result of the classification judging section 41, another classification judging section 42 is controlled to improve the accuracy of classification of objects.

The classification computing circuit 128 of the third embodiment comprises a luminance component extracting section 30 that extracts luminance components to obtain color information on an area in the multispectral image shot using a plurality of bandpass filters, a first classification judging section 41 that first makes a classification judgment on the extracted data, a judgment result judging section 51 that judges the result of the classification judging section 41, and a second classification judging section 42 that makes a classification judgment on the data items again, if necessary, on the basis of the result of the judgment result judging section 51.

The first and second classification judging sections 41, 42 have classification computing sections 43, 45 and classification deciding sections 44, 46, respectively.

The learning control section 15 is assumed to have the same function as in the first embodiment.

The configuration of FIG. 12 is an expansion of FIG. 11 and includes the block of the judgment result judging section 51.

The judgment result judging section 51 checks to see if the judgment result of the first classification judging section 41 is acceptable. If it is acceptable, the judging section will allow the judgment result to pass through directly without any modification and cause it to be outputted from the classification computing circuit 128.

If the judgment result should be judged again, it will be sent to the second classification judging section 42.

That is, the first classification judging section 41 performs the classification judging process using a piecewise linear discriminating unit, for example. When the judgment result judging section 51 cannot make a classification judgment on the judgment result of the piecewise linear discriminating unit, the second classification judging section 42 will be forced to make a judgment by vicinal distance after FS transform, thereby assuring that the processing will be performed reliably to produce a classification result.

FIG. 13 shows the flow of the process of making a classification judgment hierarchically on the basis of the first classification judgment result.

Luminance components in the color measuring area in the image shot using a plurality of band-pass filters are extracted to obtain multidimensional data (step 501).

A classification judgment computing process 1 is performed on the obtained multidimensional data (step 502) to extract vicinal classes (step 503).

The judgment result judging section 51 checks to see if the number of vicinal classes obtained at the first classification judging section 41 is one (step 504) and determines whether the degree of certainty of the judgment result is greater than a specific value (step 505).

From the judgment result of the judgment result judging section 51, if necessary, the second classification judging section 42 performs a classification judgment computing process 2 (step 506) to determine classification (step 507).

By performing the classification judging process hierarchically with such a configuration, a classification judgment can be made more accurately on multiple classes.

For instance, a high degree of multiple-class classification judging process can be performed using a linear discrimination unit (Piecewise Linear Discriminant Function method) at a multiple-class linear discriminating unit in the first classification judging section 41, and using the shortest distance method after FS transform in the second classification judging section 42.

Since the linear discriminating unit forms classification discriminating lines without reducing dimensions, it has the good classification performance but may not make a classification judgment, depending on the types of objects and the number of objects.

Thus, the classification result judging section 51 checks the judgment result of the first classification judging section 41. In the case of some result, the second classification judging section 42 makes a classification judgment by FS transform.

It is assumed that the linear discriminating unit is what has been disclosed in, for example, K. Fukunaga "Introduction to Statistical Pattern Recognition," Chapter 4 Linear Classifiers.

(A fourth embodiment)

Figure 14:
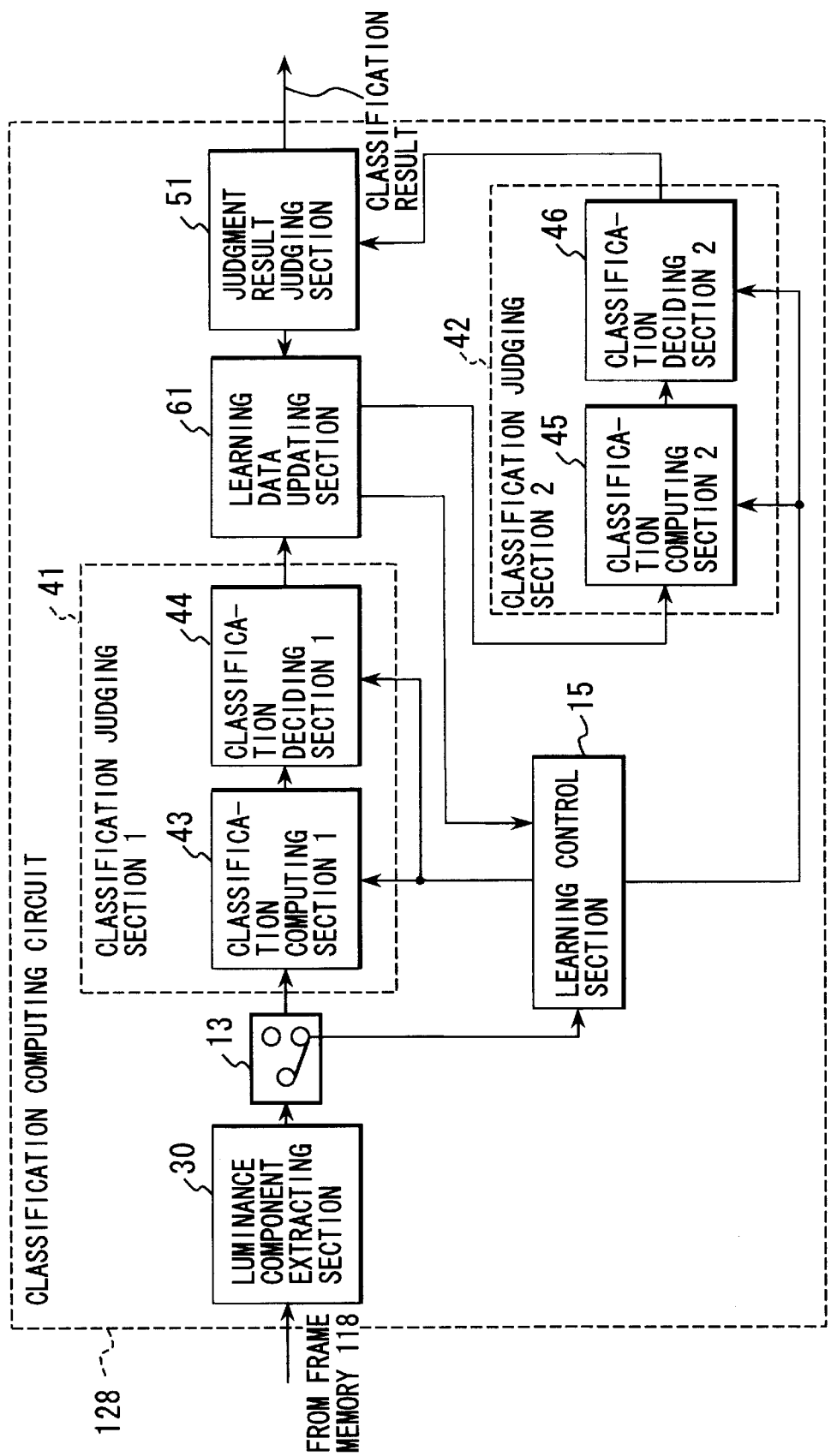
FIG. 14 is a block diagram of a color classification computing circuit according to a fourth embodiment of the present invention.

Referring to FIG. 14, a fourth embodiment of the present invention will be explained which is obtained by expanding the third embodiment so as to judge subtle color differences in an image.

With the fourth embodiment, a learning data updating section 61 and a judgment result judging section 51 are provided in the classification computing circuit 128 in a color classifying apparatus using a plurality of band-pass filters. This makes it possible to make a classification judgment on two classes accurately without learning the two classes, when the classes are divided into two classes, a class and the remaining classes.

The classification computing circuit 128 of the fourth embodiment comprises a luminance component extracting section 30 that extracts luminance components to obtain color information on an area in the image shot using a plurality of band-pass filters, a classification judging section 41 that classifies the extracted data items for the first time, a learning control section 15 that controls learning, a learning data updating section 61 that updates learning data, a judgment result judging section 51 that judges the classification judgment result, and a second classification judging section 42 that makes a classification judgment on the data items repeatedly, if necessary, on the basis of the result of the judgment result judging section 51.

With the fourth embodiment of FIG. 14, after extraction of the luminance components, the first classification judging section 41 performs the processing. Thereafter, on the basis of the result of the first classification judging section 41, the updating section 61 updates the learning data and sends the processed data to the second classification judging section 2.

The result outputted from the second classification judging section 42 is sent to the judgment result judging section 51. If necessary, the learning data updating section 61 updates the learning data again and returns the updated data to the second classification judging section 42.

That is, the learning data updating section 61, the second classification judging section 42, and the judgment result judging section 51 form a loop. When the judgment result judging section 51 judges that the first result of classification is not acceptable, the processing is repeated through the loop.

Figure 15B:
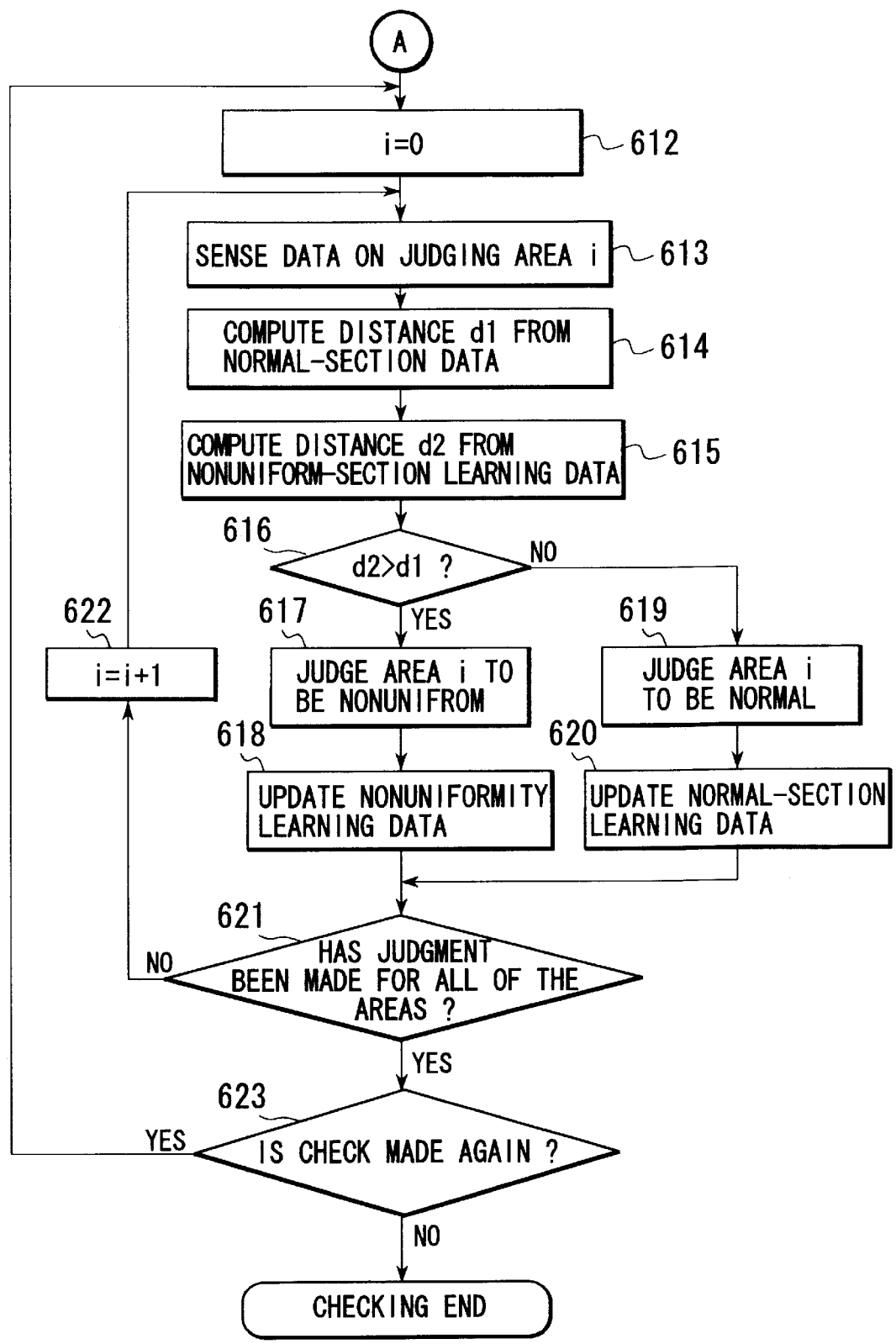

FIGS. 15A and 15B show the flow for sensing subtle color nonuniformity in the image in the fourth embodiment.

First, the outline of the processing flow will be explained.

Multidimensional data is obtained by extracting luminance components in a judgment area i from the image shot by a plurality of band-pass filters (step 603).

If the distance between the data and the learning data on a normal section previously learned and stored in a memory is great, the judgment area i will be judged to be nonuniform in color (step 606) and the judgment result will be entered in the learning data (step 607).

If the data is smaller than a specific value, the judgment area i will be judged to be normal (step 608), and the judgment result will be entered in the learning data (step 609).

After a judgment has been made on the entire judgment area, a judgment is made again at the second classification judging section 42.

The second classification judging section 42 determines not only the distance d1 between judgment area i and the normal section feature vector in the learning data memory (step 614) but also the distance d2 between judgment are i and the color nonuniformity feature vector (step 615).

The calculated distances d1 and d2 are compared with each other (step 616). If d2 is larger than d1, the judgment area will be judged to be nonuniform in color (step 617) and thereafter the learning data will be updated (step 618) If d2 is smaller than d1, it will be judged to be the normal section (step 619) and thereafter learning data will be updated (step 620).

After a judgment has been made on the entire judgment area, the judgment result judging section 51 checks the result of the classification judging section 42 again, if necessary.

Now, the flow of sensing color nonuniformity will be explained in further detail.

At step 601, a multispectral image is inputted.

At step 602, the image number is determined to be i=0, or i=0 is set in the initial value for a judgment area.

At step 603, the data in the image judgment area i is sensed. At step 604, the distance between the area i and the normal section previously learned is calculated.

Next, at step 605, a check is made to see if the distance between the area i and the normal section is equal to or larger than a specific value. If they are separated by the specific value or more, it will be judged at step 606 that the area i is nonuniform in color. If they are separated more than the specific value, it will be judged at step 608 that the area is normal.

When it has been judged that the area is nonuniform in color, the result will be entered in the color nonuniformity learning data at step 607.

The judgment result of the normal section will be entered in the normal section learning data at step 609.

Then, at step 610, a judgment is made on the entire area in the image. The loop is repeated with i=i+1 at step 611 until the judgment has finished.

Then, to sense color nonuniformity, the first judgment ends at step 610 in the entire area.

Namely, the first classification judging section 41 determines whether the judgment area is nonuniform in color or normal from the distance between the area and the normal section, and produces two types of learning data, color nonuniformity learning data and normal section learning data.

The second classification judging section 42 judges which is closer to the produced learning data items.

At step 612, judgment area i=0 and an initial value are inputted. At step 613, the data in judgment area i is sensed.

At step 614, the distance d1 between the sensed data and the normal section learning section data is found. At step 615, the distance d2 between the sensed data and the learning data on the color nonuniform section is found.

At step 616, a check is made to see if d2 is equal to or larger than d1. If s2 is larger than d1, it will be judged that the judgment area is nonuniform in color. If d1 is larger than d2, it will be judged that the judgment area is the normal section.

At step 618, the color nonuniformity learning data is updated. At step 620, the normal section learning data is updated.

Then, in the loop including step 621, i=i+1 is set to make a judgment on the entire area at step 622.

Then, at step 623, the judgment result judging section 51 determines whether a judgment should be made again. If a judgment is going to be made again, the second classification judging section 42 will make a classification judgment again.

By repeating such processes, the learning data on the color nonuniform section and the learning data on the normal section are updated properly.

Figure 16:
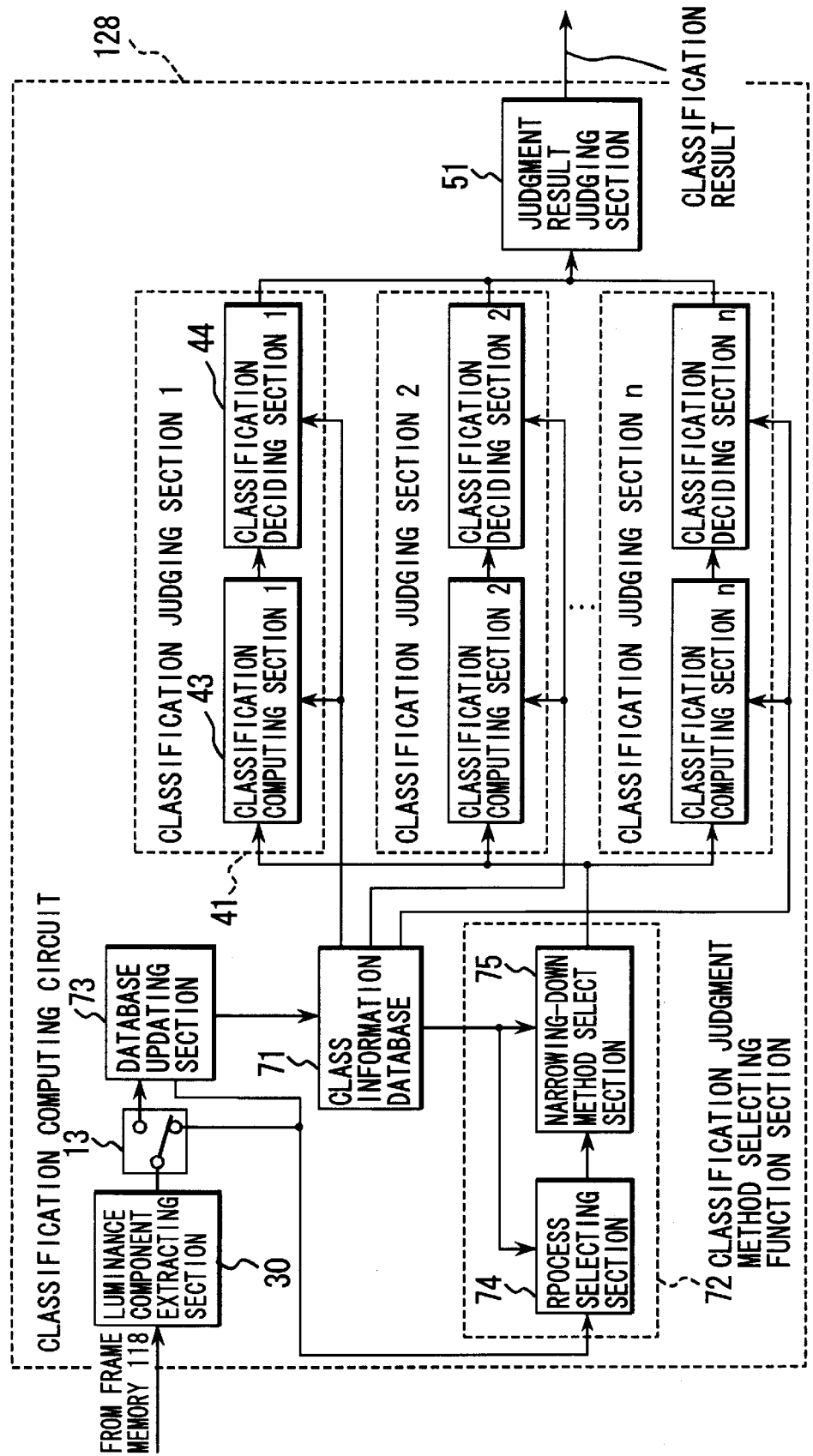
FIG. 16 is a block diagram of a color classification computing circuit according to a fifth embodiment of the present invention.

Furthermore, with the fourth embodiment, sensing can be effected with a high classification accuracy. (A fifth embodiment) A fifth embodiment of the present invention which uses plurality of classification judgment methods to improve the accuracy of classification judgment on objects will be explained by reference to FIG. 16.

With the fifth embodiment, the accuracy of classification judgment on objects is improved by selecting the optimum classification method according to the features of objects to be classified, since the accuracy of classification judgment on objects depends on the number of objects, the distributed state, or the like.

The classification judgment methods used in the fifth embodiment include a KL conversion method, an EK conversion method, an HTC classification method, a discrimination analysis method, an orthonormal discrimination analysis method, the Malina method, a nonparametric method, a subspace method, an FF method, in addition to the aforementioned FS transform method, Piecewise method, and Declustering Criterion method.

The classification computing circuit 128 of the fifth embodiment comprises a luminance component extracting section 30 that extracts luminance components to obtain color information on an area in the multispectral image shot by a plurality of bandpass filters, a class information database 71 that stores information on objects of classification, a classification judgment method selecting function section 72 that selects a classification process and a narrowing-down method on the basis of the information in the class information database, a plurality of classification judging sections 41 that make a classification judgment on the extracted data items, a judgment result judging section that judges the classification judgment result, and a database updating section 73 that updates the class information database 71.

The classification judgment method selecting function section 72 includes a process selecting section 74 and a narrowing-down method selecting section 75.

Each of the plurality of classification judging sections 41 includes a classification computing section 43 and a classification deciding section 44 to make a classification judgment by classification judgment methods differing from each other.

With the fifth embodiment, n classification judging sections are provided to make the optimum classification judgment.

The classification computing circuit 128 of the fifth embodiment is characterized by including the database 71 having class information on the extracted luminance components and the classification judging method selecting function section 72 that selects a classification judgment method on the basis of the database 71.

The plurality of classification judging sections 41 judge the classification results and output the judgment results as in the above embodiments.

In the class information database 71, the class distribution state, the central coordinates in a multidimensional space, close classes, and the like are written. For instance, classes in the vicinity of a class are put in database form.

Then, after the luminance components have been extracted, the classification judgment method selecting function section 72 causes the process select section 74 to determine by which classification judgment method the process should be performed, that is, whether a judgment is made by FS transform, the piecewise method, or the declustering criterion method.

The narrowing-down method selecting section 75 selects the number of narrowing-down levels and a narrowing-down method. For instance, in the case of seven classes, the selecting section reduces the seven classes to three, further decreases the three classes to two, and finally narrows down the two to one. Alternatively, the selecting section reduces the seven classes to five, further decreases the five classes to three and then three to two, and finally narrows down the two classes to one.

The classification judgment method selecting function section 72 selects one of the classification judging sections 1 to n according to the obtained classification method.

The judgments at the plurality of classification judging sections 41 make such a loop that the judgment result judging section 51 feeds back the result.

The judgment result judging section 51 has the function of updating the database 71 via the database updating section 73 on the basis of the judgment result including information on the narrowing-down method.

Therefore, the fifth embodiment not only performs the processing repeatedly with a high accuracy even in another classification different from dividing into two classes (e.g., a normal section and an abnormal section) but also updates the data of each class, carries out the same process again, and produces a different output.

Then, when the judgment result judging section 51 obtains the degree of certainty larger than a specific value, the section outputs it as the classification result.

With the fifth embodiment, the classification judgment method selecting function section 72 determines how many times a classification judgment should be repeated and which classification judgment should be used, thereby enabling a classification judgment to be made on multiple classes with higher accuracy.

Figure 17:
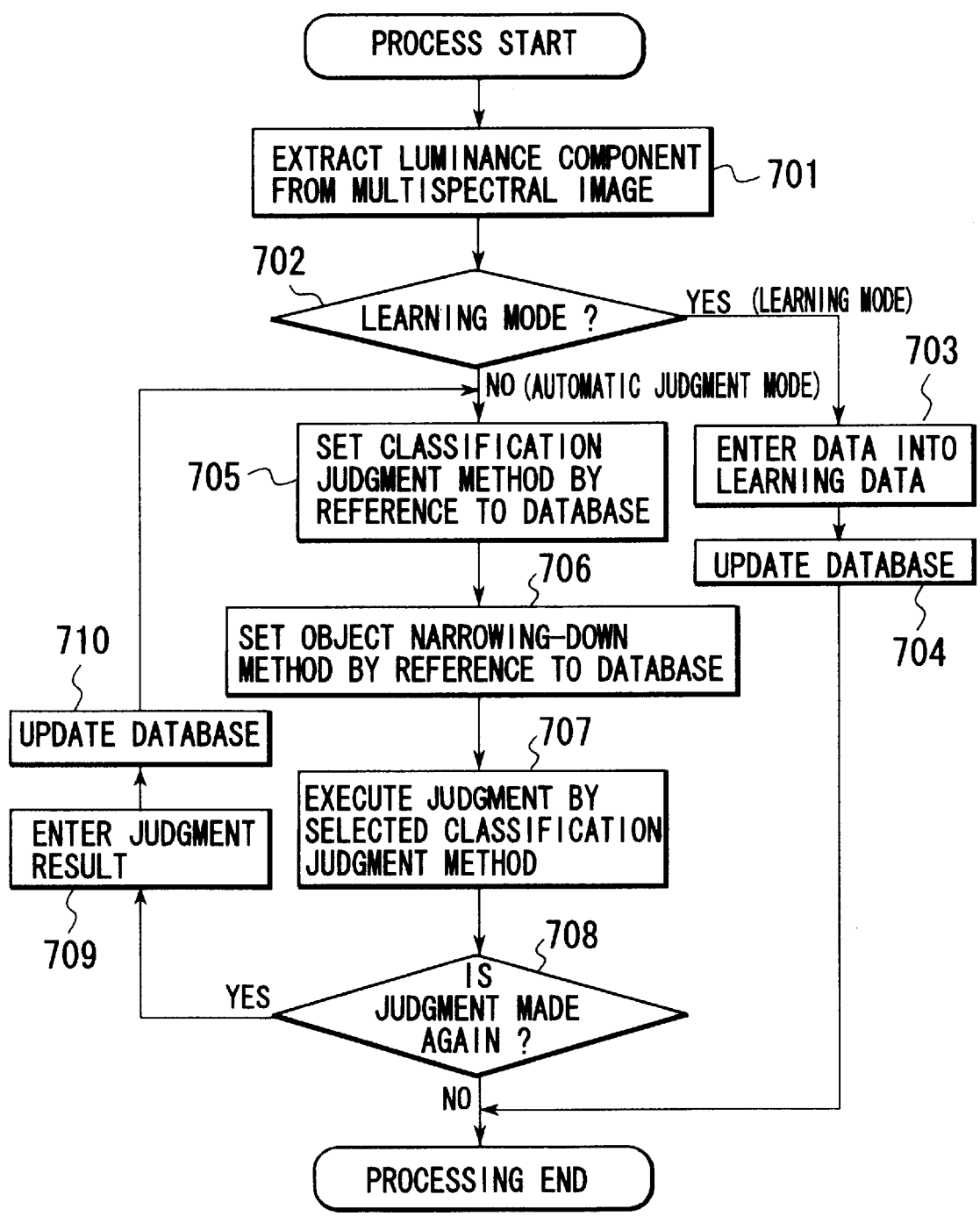
FIG. 17 is a flowchart for the processing in the fifth embodiment.

FIG. 17 shows the processing flow in the fifth embodiment.

First, luminance components are extracted from the multispectral image data to obtain multidimensional data (step 701).

It is judged whether the learning mode is on (step 702). If the learning mode is on, the mode selector switch 13 will be switched and the multidimensional data will be entered in the learning data (step 703), the class information database be updated (step 704), and the process will be terminated. If the automatic judgment mode is on, a classification judgment processing method will be set by reference to the database (step 705).

By reference to the obtained unknown data and the distribution state of a plurality of objects to be subjected to classification judgment in a multidimensional space, which classification judgment process should be used and what judgment narrowing-down method should be used are set (step 706).

Next, by the classification judgment method thus set, a classification judgment is made (step 707).

Then, on the basis of the classification judgment method and the classification judgment result, it is judged whether the check should be made again (step 708).

If the rechecking is done, the judgment result will be entered (step 709), the database be updated (step 710), and control will be returned to the classification judgment selecting function. (A sixth embodiment) A sixth embodiment of the present invention that speeds up classification calculation and improves the accuracy of classification will be explained by reference to FIGS. 18 and 19.

In a color classifying apparatus using a plurality of band-pass filters, all of the images shot by different band-pass filters do not necessarily have feature amounts effective in classification.

By eliminating images containing the data that has little effect on classification or degrades the classification performance, the sixth embodiment speeds up calculation and improve the classification performance.

A color classifying apparatus of the sixth embodiment comprises a multispectral image shooting section 81 for shooting images using a plurality of band-pass filters having different pass-band characteristics, an image processing section 82, an image select means 38 for selecting images from which features have been extracted and which are to be classified, and classification means 84 for making a classification judgment.

Figure 18:
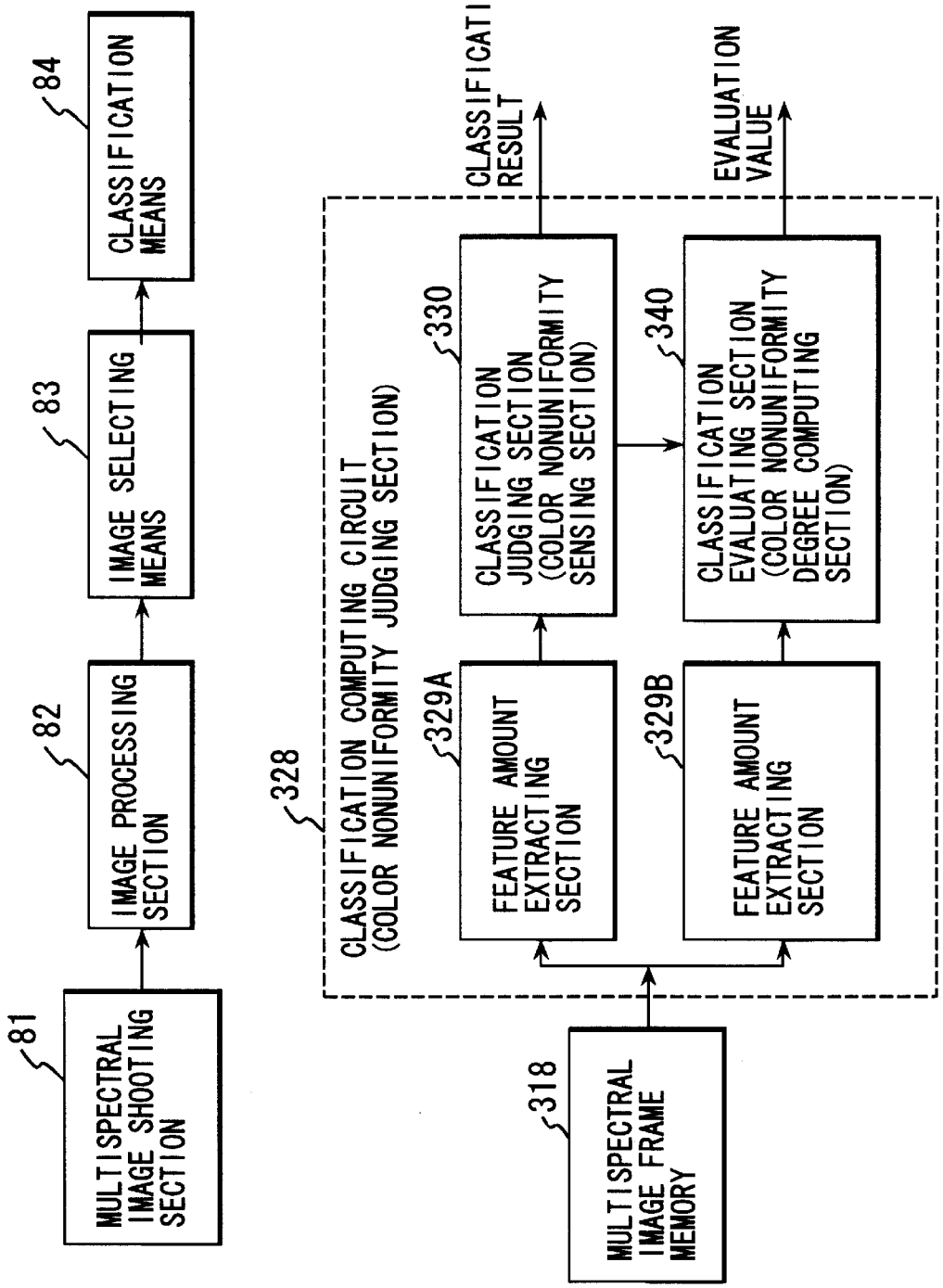
FIG. 18 is a block diagram of a color classification computing circuit according to a sixth embodiment of the present invention.

In the sixth embodiment, a multispectral image shooting section of FIG. 18 corresponding to the color classifying apparatus using a plurality of band-pass filters explained in the basic embodiment of FIG. 1, outputs the multispectral image data shot by a plurality of band-pass filters.

The image processing section 82 performs the necessary image processing, including a smoothing process, on the multispectral image data.

With the sixth embodiment, the image select means 83 reduces the dimensions of the multispectral image data subjected to the image process. Then, the classification means 84 performs color classification of the dimension-reduced data.

Figure 19:
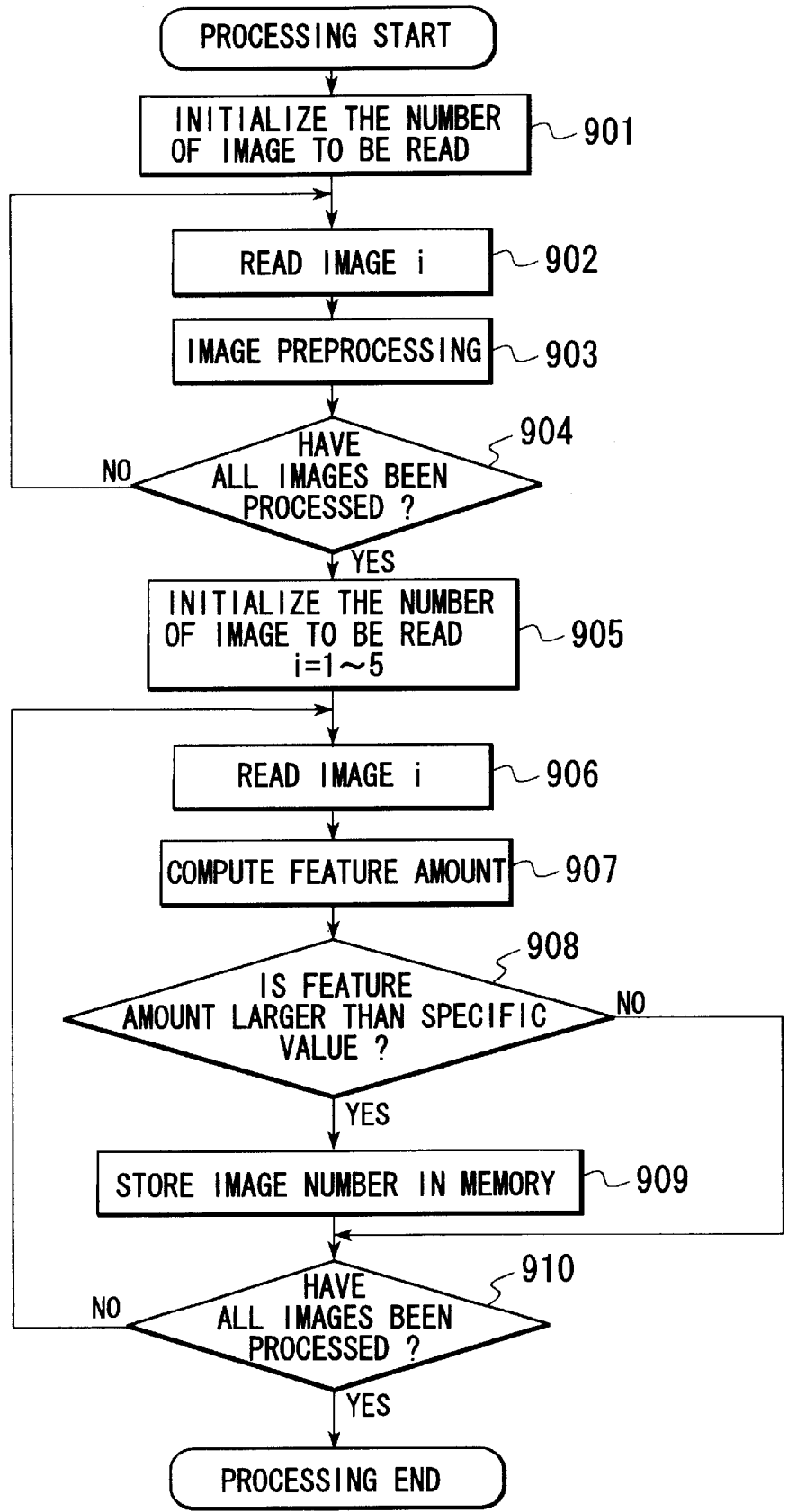
FIG. 19 is a flowchart for the processing in the important part of the sixth embodiment.

FIG. 19 shows the flow of the process of removing the unnecessary images to speed up the classification judgment process as much as possible in the sixth embodiment.

The operation of the image processing section 82 and image select means 83 in the sixth embodiment of FIG. 18 will be explained, provided that the color classifying apparatus has five band-pass filters.

When the data is inputted using five band-pass filters, five (that is, five dimensions). These images are initialized and read in sequence (steps 901, 902).

If necessary, the image processing, such as smoothing, is performed on each of the read-out images to remove noise (step 903).

It is judged whether the processing has been performed on all of the images (step 904), and the numbers of the images are initialized to read the images again (step 905).

Then, the images are read one by one (step 906) and the feature amounts are extracted (step 907). A check is made to see if each of the feature amounts is larger than a specific value (step 908). If it is larger than the specific value, the number of the image will be written into the memory (step 909) and then the feature amount of the next image will be checked (step 910).

Here, the feature amounts extracted are the contrast or density difference of images.

By controlling the classification means 84 so as to use only the data from the selected images (that is, the images obtained from the band-pass filters that present a large feature amount), the classification judgment by the classification means 84 can be made at high speeds, because the amount of data handled in the input and classification calculation is reduced.

Because images containing noise are not used for classification judgment, classification judgment can be made with higher accuracy.

In checking an image for subtle color nonuniformity, the contrast, the maximum shading difference, or the like of the image is used as a feature amount of the image.

Of the images shot by the band-pass filters corresponding to the individual dimensions, those with a low contrast or a small shading difference do not provide feature amounts effective in sensing color nonuniformity, so that their dimensions can be reduced.

Use of contrast provides the feature amount of the entire area to be sensed. Use of shading difference makes the processing speed faster.

The effects of the first to sixth embodiments are summarized as follows.

(1) Erroneous judgments are reduced because classification is performed comprehensively on the basis of the judgments between all of two classes.

(2) A high-speed, less erroneous judgment can be made by using a high-speed method for rough classification and an accurate method for fine classification.

(3) Use of classification methods in series makes the processing at the subsequent stages faster, because the number of classes can be reduced at the preceding stage.

(4) The versatility increases, because the error rate and calculation speed are taken into account according to the number of objects to be classified or the number of classes and the optimum classification method is used.

(5) The error decision rate decreases, because a more detailed judgment is made when the reliability of the judgment result is low.

(6) A judgment is made at high speeds, because a more detailed judgment is made when the reliability of the first judgment result is low, whereas the judgment is stopped there when the reliability is high.

(7) The learning control section enables classification judgment to be made on a plurality of objects with the minimum learning.

(8) Classification judgment can be made without previous learning, because the learning data is updated as classification judgment is made.

(9) A high-speed, less erroneous judgment can be made by eliminating the dimensions unnecessary for classification, or the dimensions disturbing classification.

(10) Using contrast or shading difference as a feature amount simplifies calculation for judging whether or not images of the dimensions are effective in classification.

Although the fourth embodiment can sense whether or not color nonuniformity is present, but cannot measure the degree of color nonuniformity.

Explained next will be the basis configuration of a color nonuniformity checking apparatus capable of measuring the degree of color nonuniformity according to the present invention and embodiments according to the apparatus.

(Basic configuration)

FIG. 20 is a block diagram showing the basic configuration of the color nonuniformity system.

In FIG. 20, a multispectral image frame memory 318, which corresponds to the frame memory 118 of FIG. 1, stores the multispectral image data on objects in the same manner as in FIG. 1.

The multispectral image data on objects stored in the multispectral image frame memory 318 is read into feature amount extracting sections 329A and 329B in a classification computing circuit 328, which perform specific processes on the image data.

Specifically, the feature amount extracting sections 329A and 329B function as a luminance component extracting section like the luminance component extracting section 30 of FIG. 4 in the case of the process of finding colorimetric values, and as a feature amount extraction section when a feature amount of the image, such as standard deviation, is needed.

The luminance component or the feature amount, such as standard deviation, from the feature amount extracting section 329A is used to sense the color nonuniformity of objects at a classification judgment section 330 that basically functions as a color sensing section explained later.

The luminance component or the feature amount, such as standard deviation, from the feature amount extracting section 329B is used to compute the degree of color nonuniformity of objects at a classification evaluation section 340 that basically functions as a color-nonuniformity degree computing section explained later.

Namely, the classification judgment section 330 outputs the classification result of color classification of objects, whereas the classification evaluation section 340 outputs an evaluation value, such as color nonuniformity of objects.

(A seventh embodiment)

FIG. 21 is a block diagram of a color nonuniformity checking apparatus according to a seventh embodiment of the present invention based on the basic configuration described above.

The seventh embodiment associated with a color nonuniformity checking apparatus including a color nonuniformity sensing section 330 and a color nonuniformity degree computing section 340 will be explained.

The aforementioned fourth embodiment can sense whether or not color nonuniformity is present, but cannot measure the degree of color nonuniformity. To overcome this shortcoming, the seventh embodiment is provided with the color nonuniformity computing section 340, which realizes a color nonuniformity checking system capable of measuring the degree of color nonuniformity of objects.

In FIG. 21, a multispectral image frame memory 318, which corresponds to the frame memory 118 of FIG. 1, stores the multispectral image data on the objects shot by, for example, a CCD imaging element capable of taking in multispectral images in the same manner as in FIG. 1.

The multispectral image data on objects stored in the multispectral image frame memory 318 is read into a color nonuniformity judging section 328A, which performs specific processes on the image data.

On the basis of the output of the color nonuniformity judging section 328A, a judgment result output section 345 outputs the judgment result.

The color nonuniformity judging section 328A includes feature amount extracting sections 329A and 329B as described above, a color nonuniformity sensing section 330, and a color-nonuniformity degree computing section 340.

The result of the color nonuniformity sensing section 330 is stored in a color nonuniformity sensing result memory 342. The result of the color-nonuniformity degree computing section 340 is stored in a color-nonuniformity computing result memory 344.

In FIG. 21, the color nonuniformity sensing process and the color-nonuniformity degree computing process can be performed in parallel.

The color-nonuniformity degree computing section 340 can measure the degree of color nonuniformity accurately by using as a feature amount not only shading difference as shown in the fourth embodiment but also the standard deviation or contrast of the multispectral image, or the distortion degree or pointedness degree in the density histogram.

(An eighth embodiment)

FIG. 22 is a block diagram of a color nonuniformity checking apparatus according to an eighth embodiment of the present invention, which performs the color nonuniformity sensing process and the color-nonuniformity degree computing process in sequence, instead of performing these two processes in parallel as in the seventh embodiment.

In FIG. 22, a multispectral image frame memory 318, which corresponds to the frame memory 118 of FIG. 1, stores the multispectral image data on the objects shot by, for example, a CCD imaging element capable of taking in multispectral images in the same manner as in FIG. 1.

The multispectral image data on objects stored in the multispectral image frame memory 318 is read into a color nonuniformity judging section 328B, which performs specific processes on the image data.

On the basis of the output of the color nonuniformity judging section 328B, a judgment result output section 345 outputs the judgment result.

The color nonuniformity judging section 328B includes feature amount extracting sections 329A and 329B as described above, a color nonuniformity sensing section 330, and a color-nonuniformity degree computing section 340.

The result of the color nonuniformity sensing section 330 is stored in a color nonuniformity sensing result memory 342. The result of the color-nonuniformity degree computing section 340 is stored in a color-nonuniformity computing result memory 344.

In this case, the multispectral image data on objects stored in the multispectral image frame memory 318 takes a process route 1, passing through a feature amount extracting section 329A and entering a color nonuniformity sensing section 330, which senses color nonuniformity.

After the result of the color nonuniformity sensing section 330 has been stored in a sense result memory 342, the multispectral image data takes a second process route 2, passing through a feature amount extracting section 329B and entering a color-nonuniformity degree computing section 340, which computes the degree of color nonuniformity.

At this time, the color-nonuniformity degree computing section 340 computes the degree of color nonuniformity, referring to the color nonuniformity sensing result stored in the color nonuniformity sensing result memory 342.

Here, each time the color nonuniformity sensing result stored in the color nonuniformity sensing result memory 342 is updated, the processing may be switched to process route 2.

In the color-nonuniformity degree computing section 340, the standard deviation of the multispectral image may be used as the degree of color nonuniformity. Alternatively, the Fisher ratio obtained by learning the result of the color nonuniformity sensing section 330 or the calculated value by the declustering criterion method may be used as the degree of color nonuniformity.

In this case, the degree of color nonuniformity may be obtained this way: after color nonuniformity has been sensed in two classes by the color nonuniformity judging method in the fourth embodiment, the Fisher ratio is obtained by performing FS transform in the two classes and used as the degree of color nonuniformity.

In the color nonuniformity checking apparatus of the eighth embodiment, the sequence of process route 1 and process route 2 described above may be reversed.

That is, the degree of color nonuniformity may be first determined and the color nonuniformity be sensed by reference to the degree of color nonuniformity.

(A ninth embodiment)

FIG. 23 is a block diagram of a color nonuniformity checking apparatus according to a ninth embodiment of the present invention, in which a color nonuniformity judging section 328C includes a feature amount extracting section 329 and a colorimetric value computing section 347.

In FIG. 23, a multispectral image frame memory 318, which corresponds to the frame memory 118 of FIG. 1, stores the multispectral image data on the objects shot by, for example, a CCD imaging element capable of taking in multispectral images in the same manner as in FIG. 1.

The multispectral image data on objects stored in the multispectral image frame memory 318 is read into a color nonuniformity judging section 328C, which performs specific processes on the image data.

On the basis of the output of the color nonuniformity judging section 328C, a judgment result output section 345 outputs the judgment result.

The color nonuniformity judging section 328C includes not only a color nonuniformity sensing section 330 and a color-nonuniformity degree computing section 340 but also a feature amount extracting section 329 and a colorimetric value computing section 347.

The result of the color nonuniformity sensing section 330 is stored in a color nonuniformity sensing result memory 342. The result of the color-nonuniformity degree computing section 340 is stored in a color-nonuniformity computing result memory 344.

In this case, the multispectral image data on objects stored in the multispectral image frame memory 318 is read into a feature amount extracting section 329 of the color nonuniformity judging section 328C.

The feature amount extracting section 329 functions as a luminance component extracting section like the luminance component extracting section 30 of FIG. 4 in the case of the process of determining the colorimetric value and as a feature amount extracting section when a feature amount of images, such as standard deviation.

The colorimetric value computing section 347 in the color nonuniformity judging section 328C is provided for reference to the colorimetric value, taking into account the characteristics of the bandpass filters of the rotational color filters 112 of FIG. 1 used to obtain multispectral image data.

Then, the color nonuniformity sensing section 330 is forced to effect the color nonuniformity sensing, referring to the colorimetric value from the colorimetric value computing section 347. Similarly, the color-nonuniformity degree computing section 340 is caused to calculate the degree of color nonuniformity, referring to the colorimetric value.

In checking color nonuniformity, this makes it possible to judge that the image data is nonuniform in color when the color difference is equal to or larger than a specific value, and that the image data is normal when the color difference is smaller than the specific value.

In the color-nonuniformity degree computing section 340, the maximum color difference, the colorimetric value, or the standard deviation of the colorimetric value itself can be used as the degree of color nonuniformity.

FIG. 24 is a flowchart of the processing in FIG. 23.

FIG. 24 shows an example of sensing color nonuniformity by color difference.

Once a color nonuniformity sensing process has started, a multispectral image is inputted and then the average colorimetric value of the entire sensing area is determined (step S101 and step S102).

In this case, colorimetric values, such as $L^*a^*b$ values or X, Y, Zd stimulation values are found.

Then, the sensing area is divided and divided area number i=0 is inputted as an initial value (step S103 and step S104).

The colorimetric value is found for each of the divided areas or the colorimetric value of divided area i is computed, and the color difference between divided area i and the entire sensing area is determined (steps S105, S106).

Then, a check is made to see if the color difference is greater than a specific value. If it is equal to or greater than the specific value, the divided area will be judged to be nonuniform in color and be displayed (steps S107, S108).

If the color difference is not greater than the specific value, the divided area will be judged to be normal and be displayed (step 109).

Then, a check is made to see if a judgment has been made on all of the divided areas. If all of the divided area have not been judged, the divided area number is incremented by one and the process is repeated (steps S110, S111).

Figure 25:
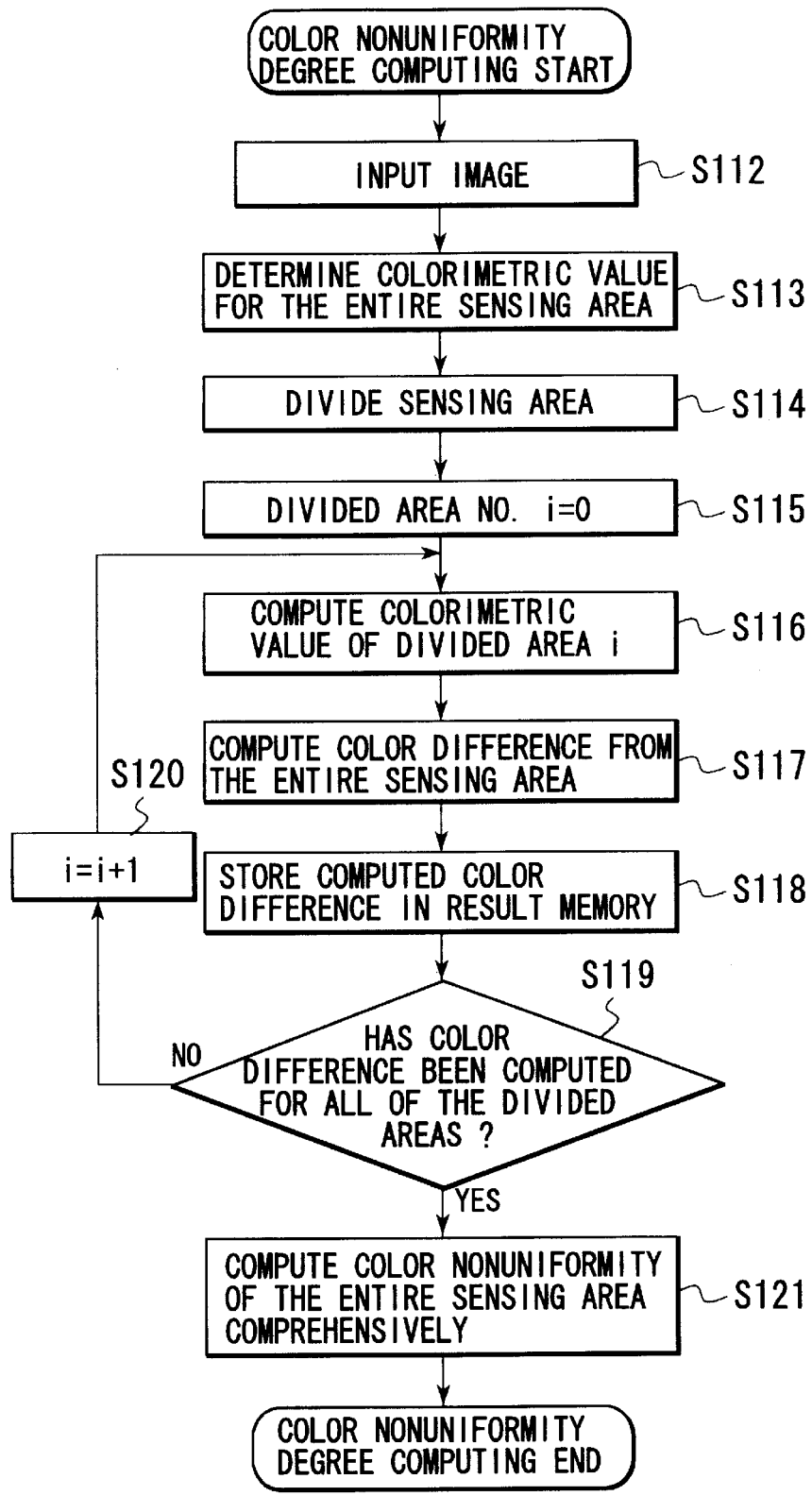
FIG. 25 is a flowchart for the processing in the important part of the color nonuniformity checking apparatus of the ninth embodiment.

FIG. 25 is a flowchart for an example of sensing the degree of color nonuniformity by color difference.

Once a color-nonuniformity degree sensing process has started, a multispectral image is inputted and then the average colorimetric value of the entire sensing area is determined (step S112 and step S113).

In this case, colorimetric values, such as $L^*a^*b$ values or X, Y, Zd stimulation values are found.

Then, the sensing area is divided and divided area number i=0 is inputted as an initial value (step S114 and step S115).

The colorimetric value is found for each of the divided areas or the colorimetric value of divided area i is computed, and the color difference between divided area i and the entire sensing area is determined (steps S116, S117).

Next, the computed color difference is stored in the color-nonuniformity degree computing result memory 344 and a check is made to see if the color difference has been computed for all of the divided areas. If it has not computed for all of the divided areas, the divided area number will be incremented by one and the process be repeated (steps S118, S119, S120).

Then, after the color difference has been determined for all of the divided areas, the degree of color nonuniformity in the entire sensing area is computed through filters on the basis of the color difference in each of the divided areas stored in the color-nonuniformity degree computing result memory 344, thereby sensing the degree of color nonuniformity in the entire sensing area. Then, the process is terminated (step S121).

Figure 26:
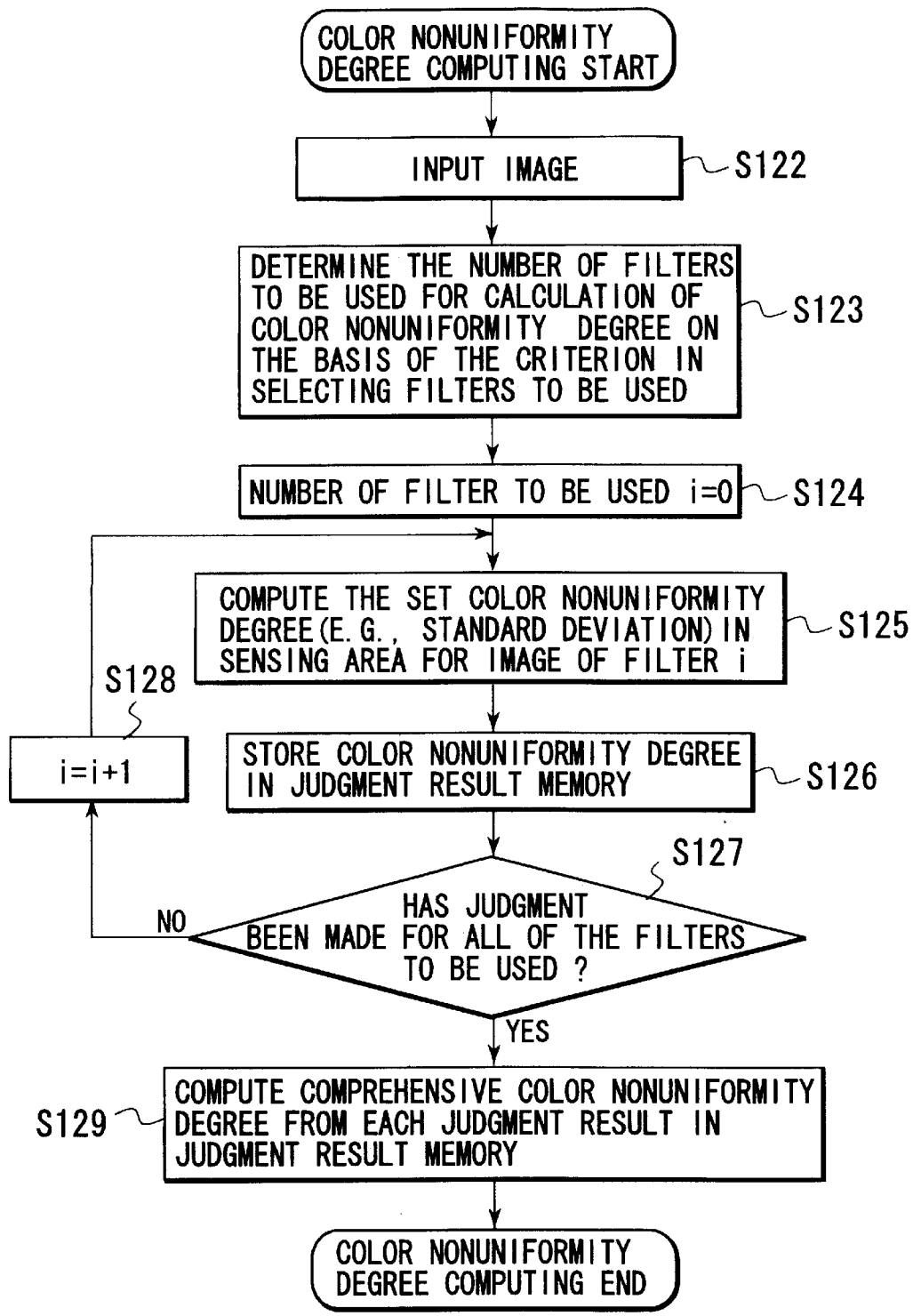
FIG. 26 is a flowchart for the processing in the important part of the color nonuniformity checking apparatus of the ninth embodiment.

FIG. 26 is a flowchart for the process of computing the degree of color nonuniformity in the process of FIG. 22.

FIG. 26 shows an example of computing the degree of color nonuniformity for each filter to digitize a general degree of color nonuniformity, when one divided area can be treated as one-dimensional data.

In this case, when the degree of color nonuniformity is computed, which filters (as many filters as desired) are used as filters for calculation of the degree of color nonuniformity is determined on the basis of the selection criterion of filters to be used for the inputted multispectral image (steps S122, S123).

Then, for the filters to be used, filter number i=0 is inputted as an initial value (step S124).

Next, the degree of color nonuniformity in the entire sensing area is computed for each of the filters by, for example, standard deviation (shading difference standard deviation) and the result is stored in the color nonuniformity judgment result memory 344 (steps S125, S126).

Then, a check is made to see if a judgment has been made on all of the filters to be used. If it has not been made on all of the filters, the divided area number will be incremented by one and the process be repeated, thereby computing the degree of color nonuniformity for all of the filters to be used (steps S127, S128).

If a judgment has been made on all of the filters to be used, the degree of color nonuniformity for each filter stored in the judgment result memory is computed comprehensively to digitize the degree of color nonuniformity of an object (step S129).

(A tenth embodiment)

FIG. 27 is a block diagram of a color nonuniformity checking apparatus according to a tenth embodiment of the present invention, where a color nonuniformity judging section 328 has a normal section data creating section 349 to perform color nonuniformity judgment and color nonuniformity checking.

In FIG. 27, a multispectral image frame memory 318, which corresponds to the frame memory 118 of FIG. 1, stores the multispectral image data on the objects shot by, for example, a CCD imaging element capable of taking in multispectral images in the same manner as in FIG. 1.

The multispectral image data on objects stored in the multispectral image frame memory 318 is read into a color nonuniformity judging section 328D, which performs specific processes on the image data.

On the basis of the output of the color nonuniformity judging section 328D, a judgment result output section 345 outputs the judgment result.

The color nonuniformity judging section 328D includes a color nonuniformity sensing section 330 and a color-nonuniformity degree computing section 340.

The result of the color nonuniformity sensing section 330 is stored in a color nonuniformity sensing result memory 342. The result of the color-nonuniformity degree computing section 340 is stored in a color-nonuniformity computing result memory 344.

In this case, the multispectral image data on objects stored in the multispectral image frame memory 318 is inputted by a switch 348 in the color nonuniformity judging section 328D to the normal section data creating section 349 in route 1 via a feature amount extracting section 329A as described earlier.

In the normal section data creating section 349, a normal section data computing section 350 computes the normal section data and stores it in a normal section data memory 351.

Next, the switch 348 changes to the process in route 2. Then, when the color nonuniformity judging process is performed at the color nonuniformity sensing section 330 and color-nonuniformity degree computing section 340 via feature amount extracting sections 329B and 329C, respectively, as described earlier, the color nonuniformity judging section 328B performs the color nonuniformity sensing process and the calculation of the degree of color nonuniformity, referring to the normal section data stored in the normal section data memory 351, and outputs the judgment result.

The normal section data creating section 349 can use the inputted reference colorimetric value or reference standard deviation, or those loaded from a file.

Once the normal section data has been created, the process may be started from route 2, when the same normal section data will do for a subsequent object.

The normal section data creating section 349 can use the average or median in the sensing area computed from the multispectral image data on objects stored in the multispectral image frame memory 318 or the image obtained by applying a low-pass filter to the entire sensing area.

In this case, the process in route 1 and the process in route 2 must be carried out in sequence.

This makes it possible to checking objects for color nonuniformity without specifying the normal section learning data.

(An eleventh embodiment)

FIG. 28 is a block diagram of a color nonuniformity checking apparatus according to an eleventh embodiment of the present invention, where a color nonuniformity judging section 328E has a normal data creating section 349 and a new class creating section 354 to perform color nonuniformity judgment and color nonuniformity checking.

In FIG. 28, a multispectral image frame memory 318, which corresponds to the frame memory 118 of FIG. 1, stores the multispectral image data on the objects shot by, for example, a CCD imaging element capable of taking in multispectral images in the same manner as in FIG. 1.

The multispectral image data on objects stored in the multispectral image frame memory 318 is read into a color nonuniformity judging section 328E, which performs specific processes on the image data.

On the basis of the output of the color nonuniformity judging section 328E, a judgment result output section 352 outputs the judgment result.

The color nonuniformity judging section 328E includes a color nonuniformity sensing section 330 and a color-nonuniformity degree computing section 340.

The result of the color nonuniformity sensing section 330 is stored in a color nonuniformity sensing result memory 342. The result of the color-nonuniformity degree computing section 340 is stored in a color-nonuniformity computing result memory 344.

In this case, the multispectral image data on objects stored in the multispectral image frame memory 318 is inputted by a switch 348 to a normal section data creating section 349 in route 1 via a feature amount extracting section 329 as described earlier, in the color nonuniformity judging section 328E.

The normal section data creating section 349 creates the normal section data in the same manner as described earlier.

Next, the switch 348 changes to route 2, where the color nonuniformity sensing section 330 carries out the color nonuniformity sensing process in the same manner as described earlier. The result of the color nonuniformity sensing is stored in the color nonuniformity sensing result memory 342.

Then, the now class creating section 354 checks to see if the class data should be updated, or if a new class can be created on the basis of the class data, referring to the color nonuniformity judgment result of the judgment result judging section 352 supplied from a class data update section 353. If a new class can be created, the creating section will create a new class.

Then, on the basis of the new class, such an approach as applies feedback to the color nonuniformity sensing process is carried out again.

To create a new class at the new class creating section 354, a learning process section 355 creates a new class by interpolation using Euclidean distance or Mahalanobis distance and enters it into a new class entry section 356.

The new class creating section 354 can enter a new class by clustering the inner product of vectors of the individual pixels in a multispectrum space by a threshold value.

Alternatively, the new class creating section 354 may enter a new class by learning the individual pixels stored in the color nonuniformity result memory 342 by FS transform or multivariate analysis as described earlier.

With the eleventh embodiment, use of the feedback process in the color nonuniformity sensing process enables color nonuniformity to be outputted in multivalue form, although only a binary value indicating the presence or absence of color nonuniformity can be outputted in the fourth embodiment.

Figure 29:
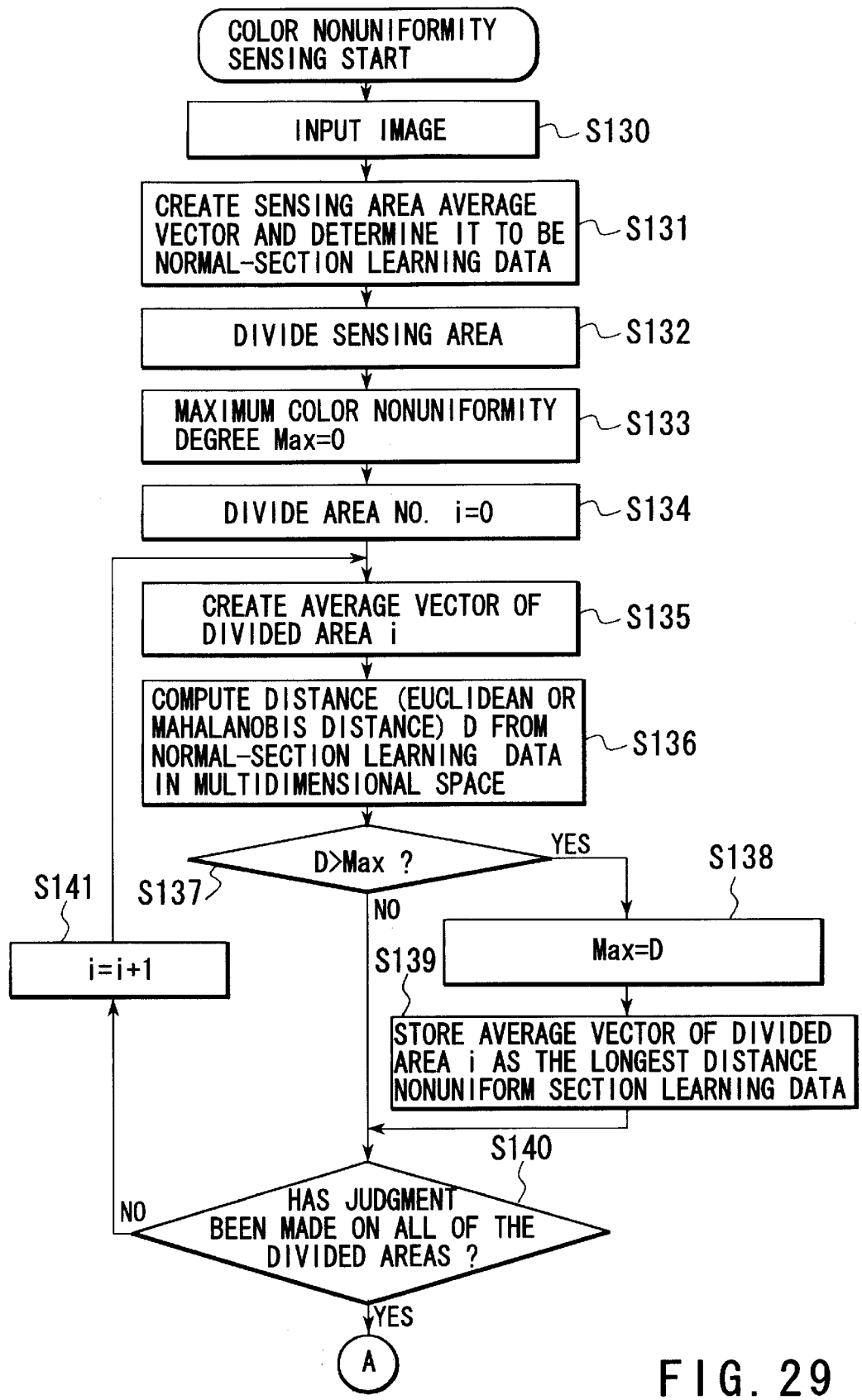
FIG. 29 is a flowchart for the processing in the important part of the color nonuniformity checking apparatus of the eleventh embodiment.
Figure 30:
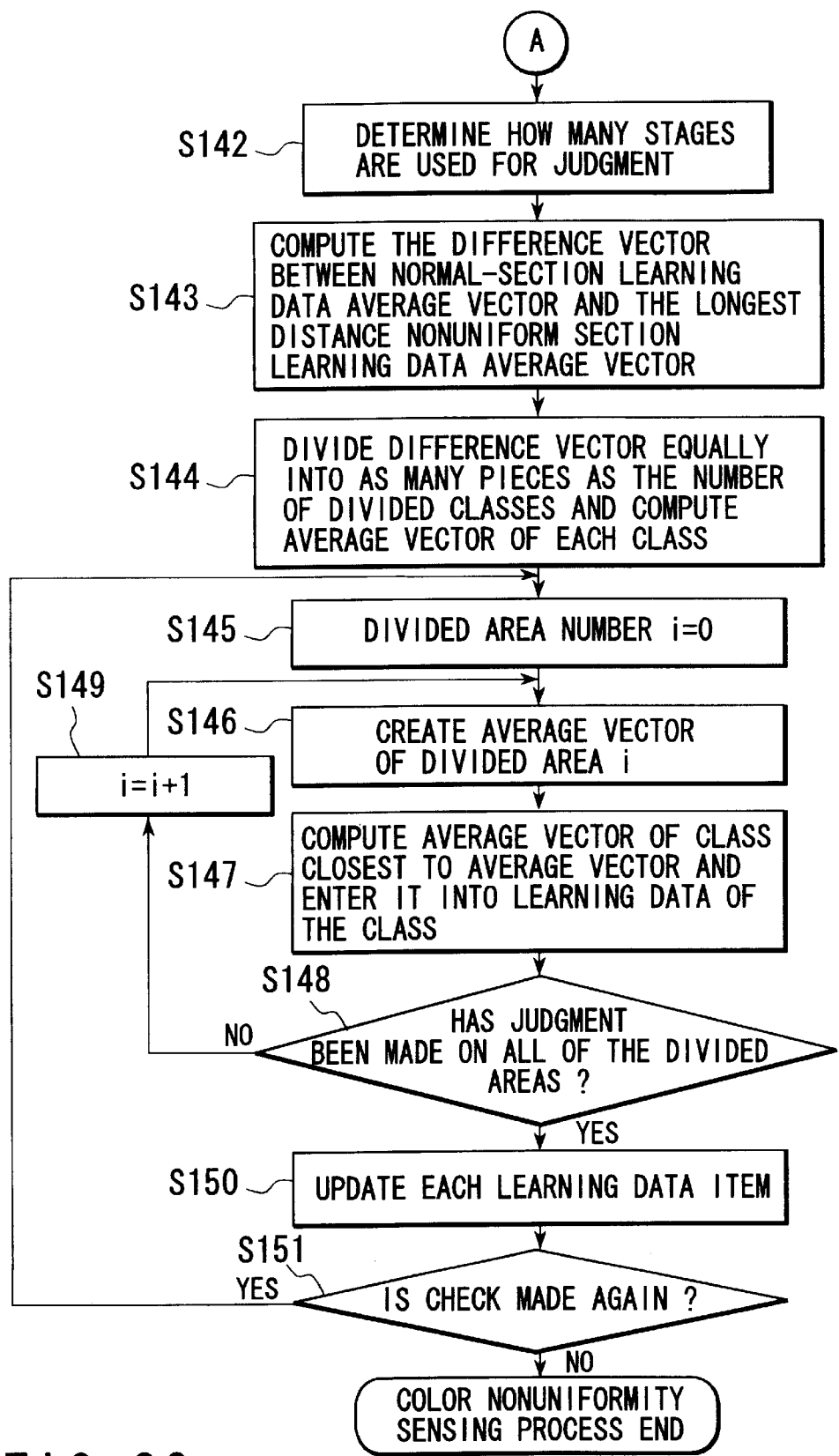
FIG. 30 is a flowchart for the processing in the important part of the color nonuniformity checking apparatus of the eleventh embodiment.

FIGS. 29 and 30 show flowcharts for color nonuniformity multivalue judgment in the eleventh embodiment.

When the color nonuniformity sensing process is started, the multispectral image data is first inputted and the sensing area average vector is created. The average vector is determined to be the normal section learning data (steps S130, S131).

Then, after the sensing area has been divided, the maximum value of the maximum color-nonuniformity degree is initialized as Max=0 and the division area number is initialized as i=0 (steps S132, S133, S134).

After the average vector of each divided area i has been determined, the distance (e.g., Euclidean distance or Mahalanobis distance) D between the average vector and the normal section learning data in a multidimensional space is computed (steps S135, S136).

Then, it is judged whether or not D is the maximum value. Because Max=0 has been set, in the first judgment, control will always branch off to YES. At this time, it is assumed that a check is made to see if the distance is the largest, or Max=D holds (step S137, S138).

If the distance D is larger than Max, that is, if the distance D is larger than the degree of color nonuniformity Max, Max=D will be inputted, the average vector of divided area i be determined to be the longest distance learning data, and will be stored as the most nonuniform learning data (step S139).

Then, it is judged whether a judgment has been made on all of the divided areas. If it has not been made on all of the divide areas, the divided area number will be incremented as i=i+1, and the processes at step 135 and later will be repeated (steps S140, S141).

After a judgment has been made on all of the divided areas, it is determined how many levels are used in judgment for multivalue output (in this case, it is assumed that the number of classes=5, and five levels are used) (step S142).

Then, the difference level between the average vector of the normal section learning data and the average vector of the color nonuniformity learning data at the longest distance is determined (step S144).

Multiple classes can be defined by dividing the difference vector equally into division classes and computing the average vector of each class.

Then, to perform the color nonuniformity judging process again, the divided area number is initialized again as i=0, and calculation is repeated to find which class has the vector of the learning data on its average vector closest to the average vector of the divided area (steps S145, S146, S147).

Then, it is judged whether or not a judgment has been made on all of the divided areas. If it has not been made on all of the divided area, the divided area number will be incremented as i=i +1, and the processes at step S146 and later are repeated (steps S148, S149).

Next, the learning data is updated on the basis of the calculation, and a check is made to see if the judgment result judging section 352 should judge again. If necessary, the feedback process will be carried out (steps S150, S151).

With the eleventh embodiment, use of the new class creating section 356 enables color nonuniformity to be outputted in multivalue form, although the fourth embodiment can produce only binary outputs in color nonuniformity sensing.

Namely, with the eleventh embodiment, as described above, by repeating the feedback process to learn the binary result in the first color nonuniformity judgment, classification vectors of the color nonuniformity section and the normal section in a multispectrum space can be created.

Then, in the second color nonuniformity judging process, by projecting the result onto the obtained classification vectors, color nonuniformity can be outputted in multivalue form.

(A twelfth embodiment)

Figure 31:
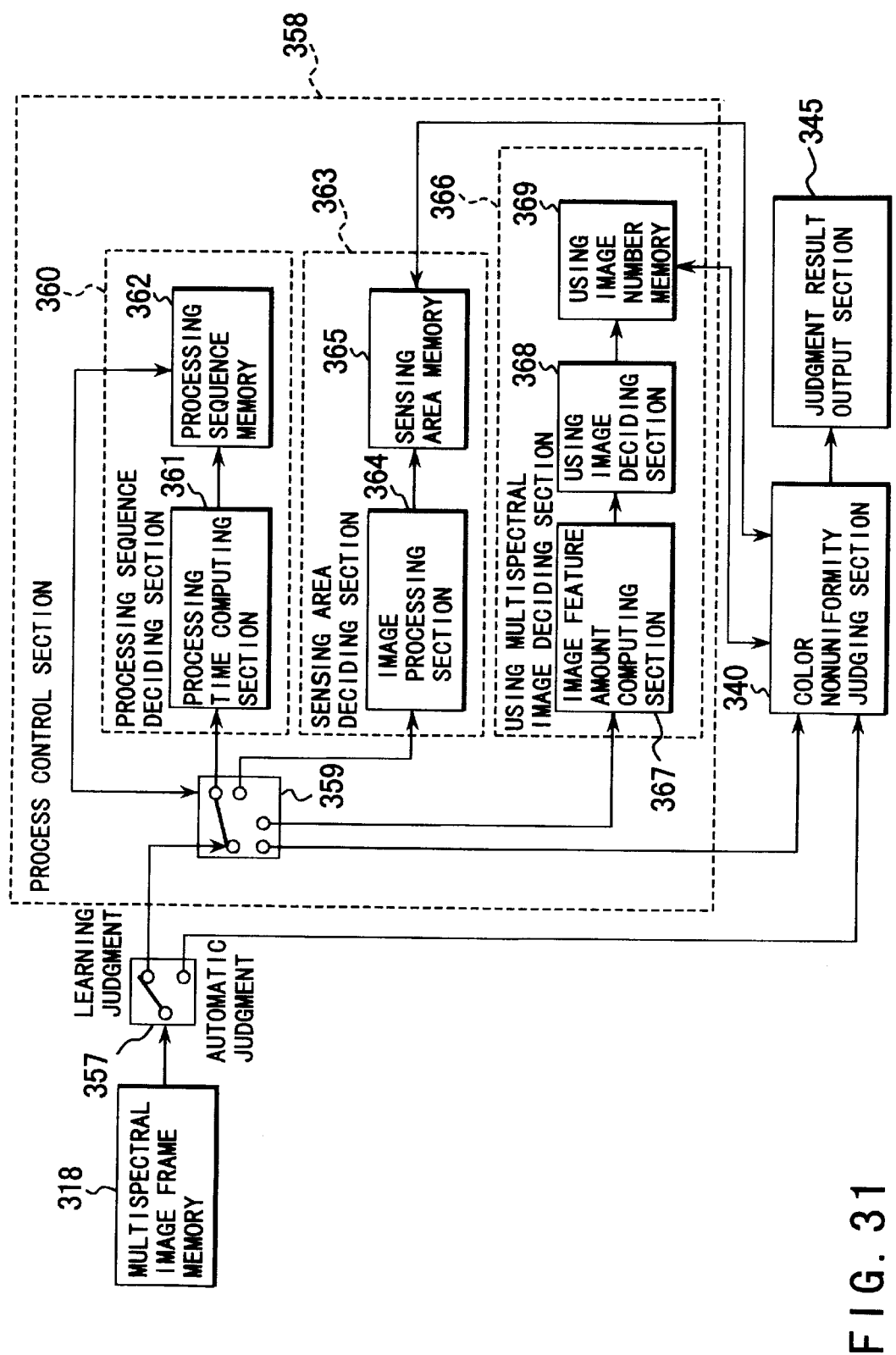
FIG. 31 is a block diagram of a color nonuniformity checking apparatus according to a twelfth embodiment of the present invention.
Figure 33:
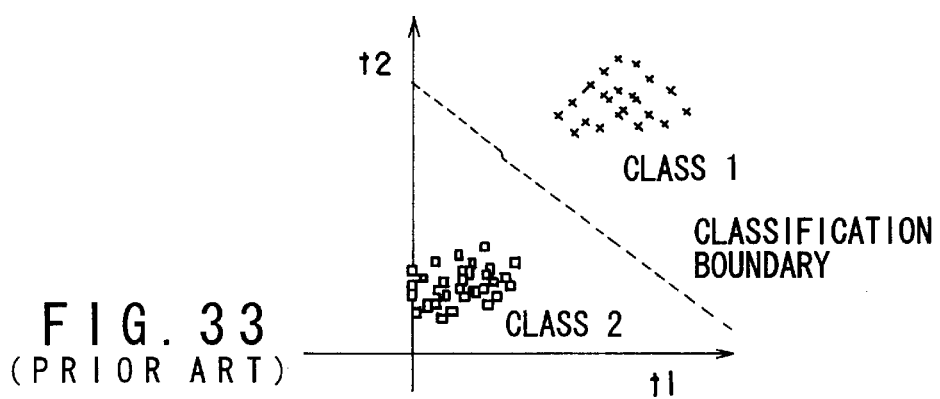
FIG. 33 illustrates the configuration of a conventional color classifying apparatus.
Figure 32:
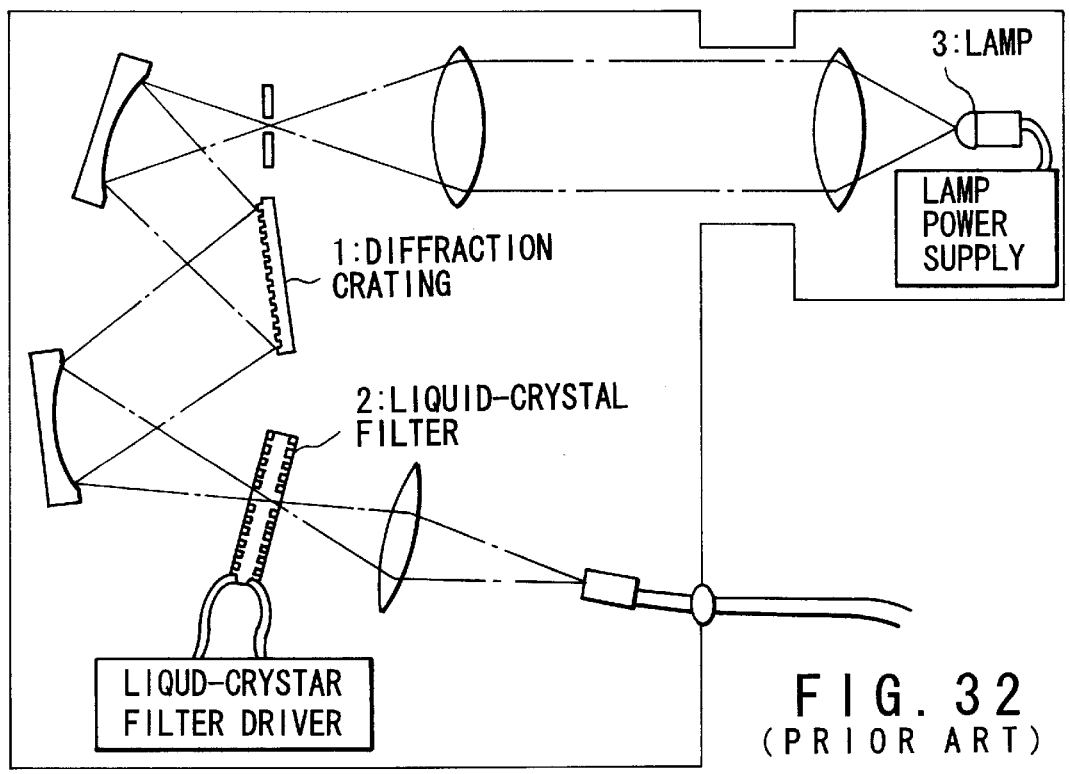
FIG. 32 is a diagram to help explain the classification boundary in a conventional color classifying apparatus.
Figure 34:
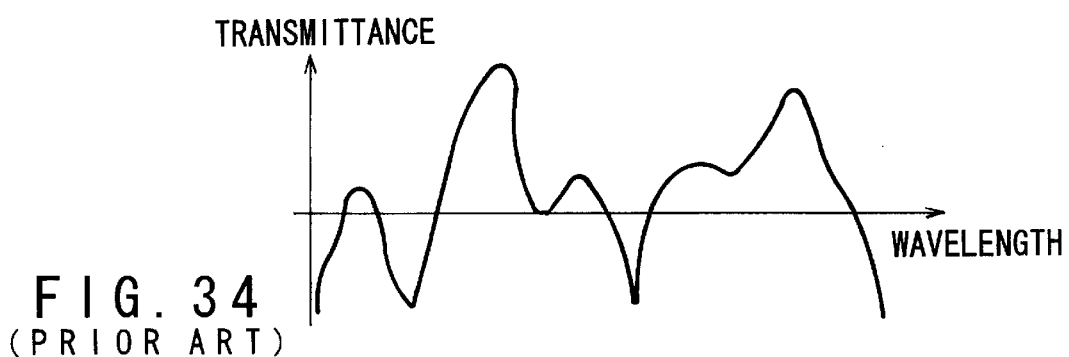
FIG. 34 shows a classification spectrum in a conventional color classifying apparatus.

FIG. 31 is a block diagram of a color nonuniformity checking apparatus according to a twelfth embodiment of the present invention, which includes a color nonuniformity judging section 369, a judgment result output section 345, and a process control section 358 to shorten the processing time of color nonuniformity judgment and color nonuniformity checking.

In FIG. 31, a multispectral image frame memory 318, which corresponds to the frame memory 118 of FIG. 1, stores the multispectral image data on the objects shot by, for example, a CCD imaging element capable of taking in multispectrum images in the same manner as in FIG. 1.

With a switch 357 in the automatic judgment mode, the multispectral image data on objects stored in the multispectral image frame memory 318 is read into a color nonuniformity judging section 340, which performs specific processes on the image data.

On the basis of the output of the color nonuniformity judging section 340, a judgment result output section 345 outputs the judgment result.

In FIG. 31, the process control section 358 has the configuration corresponding to the process control section of FIG. 1, when the control section 126 of FIG. 1 is assumed to be divided into the hardware control section and the process control section. With this configuration, the process control section not only improve the accuracy of color nonuniformity judgment and color nonuniformity checking but also shortens the processing time.

The configuration of the processing control section 358 may be applied to a case where objects are divided into multiple classes in the first to sixth embodiments.

The process control section 358 is provided with a color nonuniformity checking area decision section 363, a using multispectral image deciding section 366, and a processing sequence deciding section 360.

First, in the first processing, the sensing area deciding section 363 performs image processing at its image processing section 364 and stores the sensing area in its sensing area memory 365.

Then, in a subsequent process, a color nonuniformity judgment is made by reference to the sensing area memory 365.

By binarization, outline extraction, or specific color extraction, the sensing area deciding section 363 can make a judgment on color nonuniformity in not only such an area as is enclosed by a rectangle in an image but also in a complex portion. In addition, by limiting the judgment area to reduce the number of pixels, the deciding section can shorten the time required for the color nonuniformity judgment process.

The using multispectral image deciding section 366, in the first processing, computes a feature amount of the multispectral image at its image feature amount computing section 367, decides an image to be used at its using image deciding section 368 on the basis of its feature amount, and stores the decided using image number into the using image number memory 369.

Then, referring to the using image number memory 369, the color nonuniformity judging section 340 judges whether or not the image at that filter should be used and then makes the same color nonuniformity judgment as in the embodiments described earlier. The judgment result is outputted from the judgment result output section 345.

The using multispectral image deciding section 366 can use a feature amount, such as contrast, shading difference, or density histogram, average value, or standard deviation.

With a switch 357 in the learning judgment mode, the processing sequence deciding section 360 computes the processing time at its processing time computing section 361, decides the processing sequence, and stores the sequence into its processing sequence memory 362.

The processing sequence decision is to decide which of the sensing area deciding section 363 and the using multispectral image deciding section 366 should be allowed to operate first. The switch 359 changes the processing sequence according to the processing sequence data stored in the processing sequence memory 362.

The learning judgment mode is a mode in which a color nonuniformity judgment is made in each process after the data has been passed through the sensing area deciding section 363 and the using multispectral image deciding section 366.

The automatic judgment mode is a mode in which a color nonuniformity judgment is made on unknown objects one after another when the measuring conditions remain unchanged, or the measuring conditions are constant.

First, in a state where neither the sensing area memory 365 nor the using image number memory 369 store any data, various judgments are made to enter the sensing area and the number of the using multispectral image in these memories.

In the first learning judgment mode, the sensing area and the using multispectral image are determined and the necessary processing time is calculated from the multispectral image data of objects.

Then, from the processing time, the processing sequence is determined and the determined processing sequence is stored in the processing sequence memory 362.

With the processing sequence data being fed back to the switch 359, for example, when the time required to decide a multispectral image is longer than the time needed to decide a sensing area, a sensing area is always determined first and then an image to be used is decoded.

Furthermore, when the time needed to decide a sensing area is longer than the time required to decide a multispectral image to be used, a multispectral image to be used is determined first.

By changing the processing sequence on the basis of the processing time, the entire processing time can be shortened.

When a color nonuniformity judgment is made at the color nonuniformity judging section 340 in the learning judgment mode or the automatic judgment mode, the color nonuniformity judgment can be made by reference to the sensing area memory 365 and the using image number memory 369, and the judgment result can be sent to the judgment result output section 345.

The effects of the seventh to twelfth embodiments are summarized as follows.

(1) A checking system capable of measuring the degree of color nonuniformity of objects can be realized.

(2) In a color nonuniformity check, it is possible to judge that the object is nonuniform in color, when the color difference is equal to or larger than a specific value, and that the object is normal, when the color difference is smaller than the specific value.

(3) The degree of color nonuniformity can be computed for each filter and a general degree of color nonuniformity can be digitized, when the sensing process or the degree of color nonuniformity is computed using colorimetric values.

(4) Color nonuniformity of objects can be checked without specifying the normal section learning data.

(5) Color nonuniformity can be outputted in multivalue form.

(6) The accuracy of color nonuniformity judgment and color nonuniformity checking can be improved and the processing time can be shortened.

With the present invention, it is possible to provide a color classifying apparatus which performs the process of classifying the colors of objects using the multispectral images obtained via a plurality of band-pass filters, simplifies the configuration, reduces cost, withstands mechanical vibration, and is capable of classifying the colors of objects well without limiting the light source even when its spectrum varies, and which is capable of further improving the classification accuracy by using a classification judgment method most suitable for classifying and judging objects.

Furthermore, with the present invention, it is possible to provide a color nonuniformity checking apparatus which performs the process of checking objects for color nonuniformity using the multispectral images obtained via a plurality of band-pass filters, simplifies the configuration, reduces cost, withstands mechanical vibration, and is capable of checking objects for color nonuniformity well without limiting the light source even when its spectrum varies, and which is capable of improving the accuracy in checking object for color nonuniformity.

What is claimed is:

1. A color classifying apparatus comprising:

imaging means for imaging reflected light from an object;

optical means for forcing said reflected light from the object to form multispectral images each having a different band on said imaging means; and classifying means for computing a classification spectrum for classification using a statistical approach based on multispectral image data relating to the multispectral images formed by said imaging means, and for classifying said object into a plurality of classes using the computed classification spectrum, wherein said classifying means includes: (i) a plurality of classification judging sections that make a classification judgment on said plurality of classes using a plurality of different classification judgment methods; and (ii) a judgment result judging section that comprehensively judges the classification judgments of one or more of said plurality of classification judging sections, and wherein said judgment result judging section of said classifying means judges the classification judgment of a first one of said plurality of classification judging sections and then judges whether to cause a second one of said plurality of classification judging sections to make a classification judgment based on a judgment result of the classification judgment of the first one of said classification judging sections.

2. A color classifying apparatus according to claim 1, wherein said plurality of classification judgment sections are connected in series and make classification judgments in a superimposing manner.

3. A color classifying apparatus according to claim 1, wherein said classifying means further includes:
   a class information database in which class information on said object has been stored; and
   a classification judgment selecting function section that selects a classifying process and a narrowing-down method for said plurality of classification judging sections according to the class information stored in said class information database.

4. A color classifying apparatus according to claim 1, wherein said classifying means further includes a learning control section that generates learning data based on said multispectral image data, and that controls a classification process of said classifying means according to the generated learning data.

5. A color classifying apparatus according to claim 1, wherein said classifying means further includes a learning data updating section that updates learning data when said classification judgments are being made.

6. A color classifying apparatus comprising:
   imaging means for imaging reflected light from an object;
   optical means for forcing said reflected light from the object to form multispectral images each having a different band on said imaging means; and
   classifying means for computing a classification spectrum for classification using a statistical approach based on multispectral image data relating to the multispectral images formed by said imaging means, and for classifying said object into a plurality of classes using the computed classification spectrum,
   wherein said classifying means includes: (i) a plurality of classification judging sections that make a classification judgment on said plurality of classes using a plurality of different classification judgment methods; and (ii) a judgment result judging section that comprehensively judges the classification judgments of one or more of said plurality of classification judging sections, and
   wherein first and second ones of said plurality of classification judging sections make initial classification judgments in a superimposing manner, and said judgment result judging section then judges whether to cause said second one of said plurality of classification judging sections to make another classification judgment according to a judgment result of the initial classification judgment of said second one of said plurality of classification judging sections.

7. A color classifying apparatus according to claim 6, wherein said plurality of classification judgment sections are connected in series and make classification judgments in a superimposing manner.

8. A color classifying apparatus according to claim 6, wherein said classifying means further includes:
   a class information database in which class information on said object has been stored; and
   a classification judgment selecting function section that selects a classifying process and a narrowing-down method for said plurality of classification judging sections according to the class information stored in said class information database.

9. A color classifying apparatus according to claim 6, wherein said classifying means further includes a learning control section that generates learning data based on said multispectral image data, and that controls a classification process of said classifying means according to the generated learning data.

10. A color classifying apparatus according to claim 6, wherein said classifying means further includes a learning data updating section that updates learning data when said classification judgments are being made.

11. A color classifying apparatus comprising:
    imaging means for imaging reflected light from an object;
    optical means for forcing said reflected light from the object to form multispectral images each having a different band width on said imaging means;
    memory means for storing a plurality of sets of classification spectrums for classifying said reflected light from the object using a statistical approach based on multispectral image data relating to the multispectral images formed by said imaging means; and
    classifying means for classifying said reflected light from the object based on said plurality of is sets of classification spectrums stored in said memory means;
    wherein said classifying means includes:
    (i) first classification judging means for firstly judging said multispectral image data, and classifying the multispectral image data for narrowing down to a plurality of vicinal classes; and
    (ii) second classification judging means for rejudging the multispectral image data in each of said plurality of vicinal classes, which are narrowed down by said first classification means, within each of the vicinal classes, and for outputting a classification result.

12. A color classifying apparatus according to claim 11, wherein said classifying means further includes a learning control section that generates learning data based on said multispectral image data, and that controls a classification process of said classifying means according to the generated learning data.

13. A color classifying apparatus according to claim 11, wherein said classifying means further includes a learning data updating section that updates learning data when a classification judgment is being made.

* * * * *

UNITED STATES PATENT AND TRADEMARK OFFICE
CERTIFICATE OF CORRECTION

PATENT NO.    : 6,269,182 B1
DATED         : July 31, 2001
INVENTOR(S)   : Kensuke Ishii It is certified that error appears in the above-identified patent and that said Letters Patent is hereby corrected as shown below:

<u>Title page,</u>
Item [57], ABSTRACT,
Line 18, after "object." insert -- The color nonuniformity checking apparatus includes a multispectral image providing section for providing multispectral image data for an object, a feature amount extracting section for extracting feature amounts from the multispectral image from the multispectral image providing section, a color nonuniformity judging section for making a color nonuniformity judgment according to the feature amounts from the feature amount extracting section, and a judgment result output section for outputting a color nonuniformity judgment result according to a color nonuniformity judgment from a color nonuniformity judgment section. --.

Signed and Sealed this

Fifteenth Day of October, 2002

*Attest:*

*Attesting Officer*

JAMES E. ROGAN
*Director of the United States Patent and Trademark Office*